US009618657B2

(12) United States Patent
Fukuda et al.

(10) Patent No.: US 9,618,657 B2
(45) Date of Patent: Apr. 11, 2017

(54) OPTICAL ELEMENT, DISPLAY DEVICE, AND INPUT DEVICE

(75) Inventors: Tomoo Fukuda, Tokyo (JP); Sung-kil Lee, Tokyo (JP); Mitsuo Arima, Tokyo (JP); Fumihiko Iida, Tokyo (JP); Hiroyuki Kiso, Tokyo (JP); Yu Nomura, Tokyo (JP)

(73) Assignee: DEXERIALS CORPORATION, Tokyo (JP)

( * ) Notice: Subject to any disclaimer, the term of this patent is extended or adjusted under 35 U.S.C. 154(b) by 0 days.

(21) Appl. No.: 14/008,954

(22) PCT Filed: Mar. 30, 2012

(86) PCT No.: PCT/JP2012/059428
§ 371 (c)(1),
(2), (4) Date: Oct. 31, 2013

(87) PCT Pub. No.: WO2012/133946
PCT Pub. Date: Oct. 4, 2012

(65) Prior Publication Data
US 2014/0098422 A1    Apr. 10, 2014

(30) Foreign Application Priority Data
Mar. 31, 2011    (JP) .................. 2011-081164

(51) Int. Cl.
*G02B 1/118*    (2015.01)
*B29D 11/00*    (2006.01)
(Continued)

(52) U.S. Cl.
CPC ........ *G02B 1/118* (2013.01); *B29D 11/00346* (2013.01); *G02B 27/0006* (2013.01);
(Continued)

(58) Field of Classification Search
CPC ........ G02B 26/005; G02B 1/11; G02B 1/118; G02B 1/105; G02B 26/02; G02B 26/023;
(Continued)

(56) References Cited

U.S. PATENT DOCUMENTS

2003/0113520 A1*   6/2003   Takahashi et al. ........... 428/201
2007/0179261 A1*   8/2007   Uda et al. .................... 526/193
(Continued)

FOREIGN PATENT DOCUMENTS

CN    101663600 A  *   3/2010
CN    101943764 A      1/2011
(Continued)

OTHER PUBLICATIONS

Toyota, Hiroshi, "Antireflection Optical Elements Using Subwavelength Gratings," *Optical and Electro-Optical Engineering Contact*, 2005, vol. 43, No. 11, pp. 630-637 (with translation).
(Continued)

*Primary Examiner* — Scott J Sugarman
*Assistant Examiner* — Sharrief Broome
(74) *Attorney, Agent, or Firm* — Oliff PLC

(57) ABSTRACT

An optical element has a base material having a surface and a plurality of structures which are arranged on the surface of the base material at a fine pitch equal to or shorter than the wavelength of visible light and which each includes a convex or concave portion. The elastic modulus of the material forming the structures is 1 MPa or more and 1200 MPa or less, and the surface on which the structures are formed are hydrophilic.

18 Claims, 29 Drawing Sheets

(51) Int. Cl.
*G02F 1/1335* (2006.01)
*G02B 27/00* (2006.01)
*B82Y 20/00* (2011.01)
*B82Y 40/00* (2011.01)
*G02F 1/1333* (2006.01)

(52) U.S. Cl.
CPC ........ *G02F 1/133502* (2013.01); *B82Y 20/00* (2013.01); *B82Y 40/00* (2013.01); *G02F 1/13338* (2013.01); *G02F 2201/38* (2013.01); *G02F 2202/36* (2013.01)

(58) Field of Classification Search
CPC .... G02B 27/0018; G02B 26/001; G02B 1/10; G02B 1/111; G02B 2207/115; G02B 26/004; G02B 26/0833; G02B 1/043; G02B 1/06; G02B 1/115; G02B 26/00
USPC ........... 359/601, 229, 290, 488.01, 580, 591
See application file for complete search history.

(56) References Cited

U.S. PATENT DOCUMENTS

| | | | |
|---|---|---|---|
| 2007/0285602 A1* | 12/2007 | Takeda et al. | 349/117 |
| 2010/0323165 A1 | 12/2010 | Sakuma et al. | |
| 2010/0328565 A1* | 12/2010 | Kubota | G02F 1/133707 349/43 |
| 2011/0002041 A1* | 1/2011 | Tazawa | G02B 1/118 359/609 |
| 2011/0051249 A1 | 3/2011 | Endoh et al. | |

FOREIGN PATENT DOCUMENTS

| | | |
|---|---|---|
| EP | 2 128 659 A1 | 12/2009 |
| EP | 2 293 121 A1 | 3/2011 |
| JP | 2006-051658 A | 2/2006 |
| JP | 2006-182015 A | 7/2006 |
| JP | A-2007-4155 | 1/2007 |
| JP | 2010-085502 A | 4/2010 |
| JP | 2011028229 A * | 2/2011 |
| JP | A-2011-28229 | 2/2011 |
| JP | 2011-046193 A | 3/2011 |
| JP | A-2011-53496 | 3/2011 |
| WO | WO 2008/023816 A1 | 2/2008 |
| WO | 2008/096872 A1 | 8/2008 |
| WO | WO 2010/143503 A1 | 12/2010 |
| WO | WO 2011/027909 A1 | 3/2011 |

OTHER PUBLICATIONS

NTT Advanced Technology Corporation, "Metallic Mold Master for Wavelength-Independent Antireflection Object (moth-eye)," [online], [Searched on Mar. 31, 2011], Internet http://keytech.ntt-at.co.jp/nano/prd_0033.html (with partial translation).
International Search Report issued in International Patent Application No. PCT/JP2012/059428 mailed Jul. 17, 2012.
International Preliminary Report on Patentability issued in International Patent Application No. PCT/JP2012/059428 dated Oct. 8, 2013.
Extended European Search Report issued in European Application No. 12763653.8 dated Sep. 3, 2014.
Dec. 16, 2014 Office Action issued in Chinese Application No. 201280016480.X.
Jul. 14, 2015 Office Action issued in Chinese Application No. 201280016480.
Dec. 1, 2015 Notification of Reasons for Refusal issued in Japanese Application No. 2013-507853.
Aug. 5, 2016 Office Action issued in European Application No. 12763653.8.
Jun. 13, 2016 Office Action issued in Japanese Application No. 2013-507853.
Apr. 1, 2016 Office Action issued in Russian Application No. 2013143556.

* cited by examiner

A

B

A

B

C

A

B

A

B

A

B

C

OPTICAL ELEMENT, DISPLAY DEVICE, AND INPUT DEVICE

TECHNICAL FIELD

The present technology relates to an optical element having an anti-reflection function, a display device, and an input device. In particular, the present technology relates to an optical element in which a large number of structures comprising convex or concave portions are arranged on the surface of the element at a fine pitch equal to or shorter than the wavelength of visible light, a display device, and an input device.

BACKGROUND ART

There has been an optical element having a light-transmitting substrate made of glass or plastic, which has been subjected to a surface treatment to reduce the reflection of light on the surface. As this type of surface treatment, there is a method of forming a fine and dense concavo-convex shape (moth eye) on the surface of an optical element (see, for example, Non-Patent Literature 1).

When light passes through the surface of an optical element having a periodic concavo-convex surface, diffraction of light generally occurs, whereby the straight component of the transmitted light is largely reduced. However, when the pitch of the concavo-convex shape is shorter than the wavelength of the transmitted light, diffraction does not occur. For example, when the concavo-convex shape is rectangular as described below, an anti-reflection effect for light having a single wavelength corresponding to the pitch and depth can be obtained.

As moth eye structures produced by electron beam exposure, fine tent-shaped moth eye structures (pitch: about 300 nm, depth: about 400 nm) have been disclosed (see, for example, Non-Patent Literature 2). In the moth eye structures, high-performance anti-reflection characteristics having a reflectance of 1% or less can be obtained.

As moth eye structures produced by a complex method of a process of manufacturing a master of an optical disk and an etching process, bell-shaped and elliptical frustum-shaped moth eye structures have been disclosed (see, for example, Patent Literature 1). In these structures, anti-reflection characteristics close to those manufactured by electron beam exposure can be obtained.

CITATION LIST

Patent Literature

Non-patent Literature 1: "Optical and Electro-Optical Engineering Contact," Vol. 43, No. 11 (2005), 630-637
Non-patent Literature 2: "Mold die master for anti-reflective structure (moth eye) free of the wavelength dependency," NTT Advanced Technology Corporation, (online), (searched on Mar. 31, 2011), Internet <http://keytech.ntt-at.co.jp/nano/prd_0033.html>
Patent Literature 1: Pamphlet of International Publication No. 08/023816

SUMMARY OF INVENTION

Technical Problem

In moth eye structures as described above, a principle in which a fine concavo-convex shape formed on the surface changes the refractive index in stages to suppress reflection is adopted. When a fingerprint is attached to the structures, it is expected to remove the stain thereof by wiping with a dry cloth. This is because the stain such as an oil component contained in the fingerprint is filled in concave portions of the moth eye structures and as a result, a function of suppressing reflection may be lost.

When a fingerprint is attached to the moth eye structures, a stain is attached in the pattern of the fingerprint, and concave portions of the structures are impregnated with the attached stain by capillary action. In this case, when the structures are wiped with a dry cloth, the stain is filled only in the concave portions. As a result, a reflection-suppressing effect due to the concavo-convex shape is reduced, and the reflectance is increased.

When a surface is coated with a substance with a low-surface energy such as fluorine, impregnation of the concave portions of the structures is reduced to some extent. However, the impregnation, of the concave portions of the structures cannot be prevented by wiping with a dry cloth. This is because the concave portions of the structures are smaller than fibers used fox the dry cloth, that is, a force of allowing a stain to remain in the concave portions is larger than a force of absorbing a stain with the fibers.

Further, a conventional material requires a highly hydrophilic surface in wiping with a damp cloth. This is because water needs to enter under the stain attached to the surface of the structures in the wiping with a damp cloth. Such a super hydrophilic surface treatment tends to easily cause a problem of durability, and has a problem in practical terms. Therefore, it is difficult that a stain on the moth eye structures is removed by the conventional technique.

Consequently, an object of the present technology is to provide an optical element capable of wiping a stain such as a fingerprint, a display device, and an input device.

Solution to Problem

In order to solve the problems, a first technology is an optical element including:
 a base material having a surface; and
 a plurality of structures which are arranged on the surface of the base material at a fine pitch equal to or shorter than the wavelength of visible light and which each comprise a convex or concave portion, wherein
 the elastic modulus of a material forming the structures is 5 MPa or more and 1200 MPa or less, and
 the surface on which the structures are formed is hydrophilic.

A second technology is an optical element including a plurality of structures which are arranged at a fine pitch equal to or shorter than the wavelength of visible light and which each comprise a convex portion, wherein
 lower portions of the adjacent structures are bonded to each other,
 the elastic modulus of a material forming the structures is 5 MPa or more and 1200 MPa or less, and
 a surface on which the structures are formed is hydrophilic.

In the present technology, a water contact angle on the surface on which the structures are formed is preferably 110° or less, and more preferably 30° or less.

In the present technology, an aspect ratio of the structures is preferably within a range of 0.6 or more and 5 or less.

In the present technology, it is preferable that the structures be arranged so that a plurality of track rows are forced on the surface of the base material and form a lattice pattern.

In this case, it is preferable that the lattice pattern foe at least one of a hexagonal lattice pattern, a quasi-hexagonal lattice pattern, a tetragonal lattice pattern, and a quasi-tetragonal lattice pattern. Further, it is preferable that the structures each have an elliptical cone shape or an elliptical frustum shape, which has a long axis direction along a track extending direction. The tracks preferably have a linear or arc shape. Further, the tracks preferably meander.

In the present technology, it is preferable that main structures be arranged periodically in a tetragonal lattice pattern or a quasi-tetragonal lattice pattern. The tetragonal lattice used herein means a lattice of regular quadrilateral. The quasi-tetragonal lattice does not mean the lattice of regular quadrilateral, and means a lattice of distorted regular quadrilateral.

For example, when the structures are arranged on a line, the quasi-tetragonal lattice means a deformed tetragonal lattice in which a regular quadrilateral lattice is stretched in a linear array direction (track direction) and distorted. When structures are arranged so as to meander, the quasi-tetragonal lattice means a tetragonal lattice in which a regular quadrilateral lattice is distorted by meandering array of the structures. Alternatively, the quasi-tetragonal lattice means a tetragonal lattice in which a regular quadrilateral lattice is stretched in a linear array direction (track direction) and distorted, and is distorted by meandering array of the structures.

In the present technology, it is preferable that the structures foe arranged periodically in a hexagonal lattice pattern or a quasi-hexagonal lattice pattern. The hexagonal lattice used herein means a lattice of regular hexagon. The quasi-hexagonal lattice does not mean the lattice of regular hexagon, and means a lattice of distorted regular hexagon.

For example, when the structures are arranged on a line, the quasi-hexagonal lattice means a deformed hexagonal lattice in which a regular hexagonal lattice is stretched in a linear array direction (track direction) and distorted. When structures are arrayed so as to meander, the quasi-hexagonal lattice means a hexagonal lattice in which a regular hexagonal lattice is distorted by meandering array of the structures. Alternatively, the quasi-hexagonal lattice means a hexagonal lattice in which a regular hexagonal lattice is stretched in a linear array direction (track direction) and distorted, and is distorted by meandering array of the structures.

In the present technology, an ellipse includes not only a complete ellipse defined mathematically but also an ellipse distorted partly. A circle includes not only a complete circle defined mathematically (perfect circle) but also a circle distorted partly.

In the present technology, it is preferable that an arrangement pitch P1 of the structures on the same track be longer than an arrangement pitch P2 of the structures between the adjacent two tracks. In such a configuration, the packing factor of the structures having an elliptical cone shape or an elliptical frustum shape can be improved. Therefore, the anti-reflection characteristics can be improved.

In the present technology, when each structure is formed in a hexagonal lattice pattern or a quasi-hexagonal lattice pattern on the surface of the bass material, a ratio P1/P2 of the arrangement pitch P1 of the structures on the same track to the arrangement pitch P2 of the structures between the adjacent two tracts preferably satisfies a relationship of $1.00 \leq P1/P2 \leq 1.1$ or $1.00 < P1/P2 \leq 1.1$. By setting such a numerical range, the packing factor of the structures having an elliptical cone shape or an elliptical frustum shape can be improved. Therefore, the anti-reflection characteristics can be improved.

In the present technology, when each structure is formed in a hexagonal lattice pattern or a quasi-hexagonal lattice pattern on the surface of the base material, it is preferable that each structure have an elliptical cone shape or an elliptical frustum shape which has a long axis direction along the track extending direction and in which a slope at the middle portion thereof is steeper than the slopes at the top portion and bottom portion thereof. Formation of such a shape can improve the anti-reflection characteristics and transmission characteristics.

In the present technology, when each, structure is formed in a hexagonal lattice pattern or a quasi-hexagonal lattice pattern on the surface of the base material, it is preferable that the height or depth of the structures in the track extending direction be less than that of the structures in the track row direction. When the structures do not satisfy such a relationship, the arrangement pitch in the track extending direction needs to be lengthened. Therefore, the packing factor of the structures in the track extending direction is decreased. Such a decrease in the packing factor may reduce the reflection characteristics.

In the present technology, when each structure is formed in a tetragonal lattice pattern or a quasi-tetragonal lattice pattern on the surface of the base material, it is preferable that an arrangement pitch P1 of the structures on the same track be longer than an arrangement pitch P2 of the structures between the adjacent two tracks. In such a configuration, the packing factor of the structures having an elliptical cone shape or an elliptical frustum shape can be improved. Therefore, the anti-reflection characteristics can be improved.

When the structures are formed in a tetragonal lattice pattern or a quasi-tetragonal lattice pattern on the surface of the base material, the ratio P1/P2 of the arrangement pitch P1 of the structures on the same track to the arrangement pitch P2 of the structures between the adjacent two cracks preferably satisfies a relationship of $1.4 < P1/P2 \leq 1.5$. By setting such a numerical range, the packing factor of the structures having an elliptical cone shape or an elliptical frustum shape can be improved. Therefore, the anti-reflection characteristics can foe improved.

When the structures are formed in a tetragonal lattice pattern or a quasi-tetragonal lattice pattern on the surface of the base material, it is preferable that each structure have an elliptical cone shape or an elliptical frustum shape which has a long axis direction along the track extending direction and in which a slope at the middle portion thereof is steeper than the slopes at the top portion and bottom portion thereof. Formation of such a shape can improve the anti-reflection characteristics and transmission characteristics.

When the structures are formed in a tetragonal lattice pattern or a quasi-tetragonal lattice pattern on the surface of a base material, if is preferable that the height or depth of the structures in the 45° direction or approximately 45° direction with respect to tracks be less than that of the structures in the row direction of the tracks. When the structures do not satisfy such a relationship, the arrangement pitch in the 45° direction or approximately 45° direction with respect to the track needs to be lengthened. Therefore, the packing factor of the structures in the 45° direction or approximately 45° direction with respect to the tracks is decreased. Such a decrease in the packing factor may reduce the reflection characteristics.

In the present technology, it is preferable that the large number of structures arranged on the surface of the base material at a fine pitch be arrayed so that a plurality of track rows are formed and that a hexagonal lattice pattern, a quasi-hexagonal lattice pattern, a tetragonal lattice pattern, or a quasi-tetragonal lattice pattern be configured in three adjacent track rows. Therefore, the packing density of the structures on the surface can be increased, whereby the anti-reflection effect of visible light can be enhanced. Thus, an optical element having excellent anti-reflection characteristics and a nigh transmittance can be obtained.

In the present technology, a complex method of a process of manufacturing a master of an optical disk and an etching process is preferably used to manufacture an optical element. According to the method, a master for manufacture of an optical element can be efficiently manufactured in a short time. In addition, the method can be applied to a larger base material. Thus, the productivity of an optical element can be improved. When the fine arrangement of the structures is disposed not only in a light incident surface but also in a light emitting surface, the transmission characteristics can be further improved.

The optical element of the present technology is suitably applied to a display face of a display device, an input face of an input device, a face to be printed of a printed matter, and a print face of a printing paper.

In the present technology, since the elastic modulus of a material forming the structures is 1 MPa or more and 1200 MPa or less and the aspect ratio of the structures is 0.6 or more and 5 or less, the structures are deformed when being wiped. Due to the deformation, water easily enters a space between the structures during wiping with a damp cloth and the impregnated stain is extruded.

Advantageous Effects of Invention

As descried above, according to the present technology, a stain such as a fingerprint attached to the surface of an optical element can be wiped with a dry cloth or a damp cloth.

DESCRIPTION OF EMBODIMENTS

Figure 1:
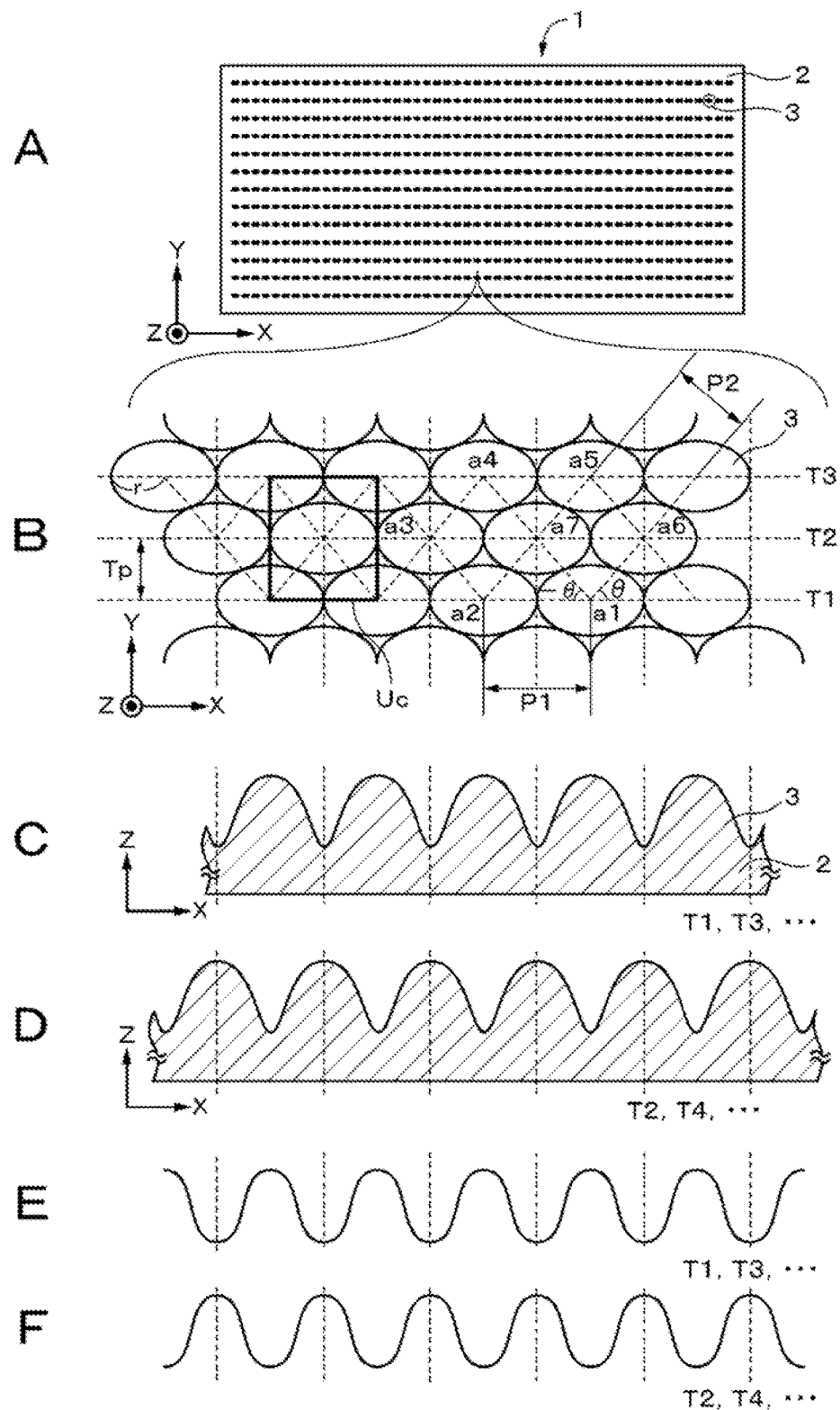
FIG. 1A is a schematic plan view showing one example of the configuration of an optical element according to a first embodiment of the present technology.
FIG. 1B is an enlarged plan view showing part of the optical element shown in FIG. 1A.
FIG. 1C is a cross-sectional view in tracks T1, T3, . . . of FIG. 1B.
FIG. 1D is a cross-sectional view in tracks T2, T4, . . . of FIG. 1B.
FIG. 1E is a schematic diagram showing a modulation waveform of laser beam used in formation of latent image corresponding to the tracks T1, T3, . . . of FIG. 1B.
FIG. 1F is a schematic diagram showing a modulation waveform of laser beam used in formation of latent image corresponding to the tracks T2, T4, . . . of FIG. 1B.

As a result of intensive studies to solve the above-described problems possessed by the conventional technologies, the present technology has been proposed. Hereinafter, the outline of the present technology will be described.

The present technicians have intensively studied, and as a result, found that when a material forming the structures has elasticity, the structures are deformed when being wiped, a stain impregnated between the structures is extruded, and the deformation enables to easily wipe the stain with a damp cloth.

In order to cause the stain impregnated in spaces between the structures by the deformation of the structures to be extruded, the adjacent structures need to be close. The elastic modulus of the material forming the structures and the aspect ratio of the structures are essential to deformation of the structures and elimination of spaces between the structures. Further, the contact angle thereof is essential to wiping with a damp cloth. The present technicians have intensively studied by experiments, and as a result, found that when the elastic modulus, aspect ratio, and contact angle fall within respective predetermined ranges, the stain can be easily removed.

In consideration of a case where a structure may be deformed, a stain can be wiped in principle at a higher pressure during wiping even when a material has a high elastic modulus. However, when a material has no elasticity, the structure may be broken or plastic deformation may be caused during wiping at a pressure at which the structure is deformed. As a result, the reflectance after wiping is higher than that before attachment of a fingerprint.

"Wiping with a dry cloth or a damp cloth is possible" in the present technology means that the reflectances before attachment of a stain such as a fingerprint and after wiping the stain are the same or nearly the same when the stain is removed by the general wiping method.

Embodiments of the present technology will be described with reference to the drawings in the following order.
1. First embodiment (example in which structures are two-dimensionally arranged on a line and a hexagonal lattice: see FIG. 1B)
2. Second embodiment (example in which structures are two-dimensionally arranged on a line and a tetragonal lattice: see FIG. 15B)
3. Third embodiment (example in which structures are two-dimensionally arranged on a circular arc and a hexagonal lattice: see FIGS. 18A and 18B)
4. Fourth embodiment (example in which structures are arranged so as to meander: see FIGS. 21A and 21B)
5. Fifth embodiment (example in which a concave structure is formed on the surface of a base material: see FIG. 23)
6. Sixth embodiment (example in which a surface treatment layer is formed: see FIG. 24)
7. Seventh embodiment (example of an optical element free of a base material: see FIG. 25)
8. Eighth embodiment (first application example to a display device: see FIG. 26)
9. Ninth embodiment (second application example to a display device: see FIG. 27)
10. Tenth embodiment (first application example to an input device: see FIGS. 28A and 28B)
11. Eleventh embodiment (second application example to an input device: see FIGS. 29A and 29B)
12. Twelfth embodiment (application example to a printing paper: see FIG. 30)
13. Thirteenth embodiment (example which has oligomer as a main component and has a particular crosslink density)

1. First Embodiment

Configuration of Optical Element

FIG. 1A Is a schematic plan view showing one example of the configuration of an optical element according to the first embodiment of the present technology. FIG. 1B is an enlarged plan view showing part of the optical element shown in FIG. 1A. FIG. 1C is a cross-sectional view in tracks T1, T3, . . . of FIG. 1B. FIG. 1D is a cross-sectional view in tracks T2, T4, . . . of FIG. 1B. FIG. 1E is a schematic diagram showing a modulation waveform of laser beam used in formation of latent image corresponding to the tracks T1, T3, . . . of FIG. 1B. FIG. 1F is a schematic diagram showing a modulation waveform of laser beam used in formation of latent image corresponding to the tracks T2, T4, . . . of FIG. 1B. FIGS. 2, 4 to 6 are each an enlarged perspective view showing part of the optical element 1 shown in FIG. 1A. FIG. 3A is a cross-sectional view of the optical element shown in FIG. 1A in a track extending direction (X direction (hereinafter sometimes referred to as a track direction as appropriate). FIG. 3B is a cross-sectional view of the optical element shown in FIG. 1A in a θ direction.

The optical element 1 is, for example, an optical sheet (sub-wavelength structure) having an anti-reflection effect according to an angle of incidence of incident light. The optical element 1 is suitably applied to an optical device such as optical instruments having various wavelength ranges (for example, an optical instrument such as a camera), a display, optical electronics, and a telescope.

The optical element 1 has a base material 2 having a main surface and a plurality of structures 3 which are disposed on the main surface at a fine pitch equal to or shorter than the wavelength of light for the purpose of reduction of reflection and which each are a convex portion. The optical element 1 has a function of preventing the reflection at an interface between the structures 3 and the surrounding air with respect to the light which passes through the base material 2 in a −Z direction in FIG. 2.

Hereinafter, the base material 2 and the structure 3 in the optical element 1 will foe described successively.

(Base Material)

The base material 2 is, for example, a transparent base material having transparency. Examples of the material for the base material 2 include, but not particularly limited to, a transparent synthetic resin such as polycarbonate (PC) and polyethylene terephthalate (PET), and an inorganic material including glass as a main component. Examples of the shape of the base material 2 include, but not particularly limited to, a sheet shape, a plate shape, and a block shape. The sheet used herein is defined to include a film. It is preferable that the shape of the base material 2 be appropriately selected according to the shape of a portion which requires a predetermined anti-reflection function in an optical instrument such as a camera.

(Structure)

A large number of structures 3 which each are a convex portion are arranged on the surface of the base material 2. The structures 3 are two-dimensionally arranged at a short arrangement pitch equal to or shorter than the wavelength band of light for the purpose of reduction of reflection, for example, at an arrangement pitch equal to the wavelength of visible light. The arrangement pitch used herein means an arrangement pitch P1 and an arrangement pitch P2. The wavelength band of light for the purpose of reduction of reflection is, for example, a wavelength band of ultraviolet light, a wavelength band of visible light, or a wavelength band of infrared light. The wavelength band of ultraviolet light used herein is within a range of 10 nm to 360 nm. The wavelength hand of visible light is within a range of 360 nm to 830 nm. The wavelength band of infrared light is within a range of 830 nm to 1 mm. Specifically, the arrangement pitch is preferably 175 nm or more and 350 nm or less. When the arrangement pitch is less than 175 nm, the structures 3 tend to be difficult to produce. On the other hand, when the arrangement pitch is more than 350 nm, the diffraction of visible light tends to occur.

Each structure 3 in the optical element 1 is arranged so that a plurality of track rows T1, T2, T3, . . . (hereinafter sometimes collectively referred to as "tracks T") are formed on the surface of the base material 2. In the present technology, the track means a portion in which the structures 3 are lined in series. Further, the row direction means a direction orthogonal to the track extending direction (X direction) in a molding surface of the base material 2.

The structures 3 are arranged in the adjacent two tracks T at the positions shifted by half pitch. Specifically, the structures 3 on one track (for example, T2) are arranged in the adjacent two tracks T at the positions (at the positions shifted by half pitch) between the other structures 3 arranged on the other track (for example, T1). Consequently, as shown in FIG. 1B, the structures 3 are arranged in the adjacent three tracks (T1 to T3) to form a hexagonal lattice pattern or a quasi-hexagonal lattice pattern with the centers of the structures 3 positioned at respective points a1 to a7. In the first embodiment, the hexagonal lattice pattern means a lattice pattern of regular hexagon. The quasi-hexagonal lattice pattern does not mean the regular hexagonal lattice pattern, but means a hexagonal lattice pattern stretched in the track extending direction (X axial direction) and distorted.

When the structures 3 are arranged to form the quasi-hexagonal lattice pattern, it is preferable that the arrangement pitch P1 (for example, a distance between a1 and a2) of the structures 3 on the same track (for example, T1) be longer than the arrangement pitch of the structures 3 between the adjacent two tracks (for example, T1 and T2), that is, the arrangement pitch P2 (for example, a distance between: a1 and a7 or between a2 and a7) of the structures 3 in the ±θ direction to the track extending direction, as shown in FIG. 1B. When the structures 3 have such an arrangement, the packing density of the structures 3 can be further improved.

From the viewpoint of easiness of molding, it is preferable that the structures 3 have a conical shape or a conical shape which is stretched or shrunk in the track direction. It is preferable that the structures 3 have an axially symmetrical conical shape or a conical shape which is stretched or shrunk in the track direction. When the adjacent structures 3 are bonded, it is preferable that the structures 3, except for lower portions bonded to the adjacent structures 3, have an axially symmetrical conical shape or a conical shape which is stretched or shrunk in the track direction. Specific examples of the conical shape include a circular cone shape, a frustum shape, an elliptical cone shape, and an elliptical frustum shape. The conical shape used herein is a concept including an elliptical cone shape and an elliptical frustum shape in addition to a circular cone shape and a frustum shape, as described above. The frustum shape is a shape obtained by cutting off the top portion of a cone. The elliptical frustum shape is obtained by cutting off the top portion of an elliptical cone.

Figure 2:
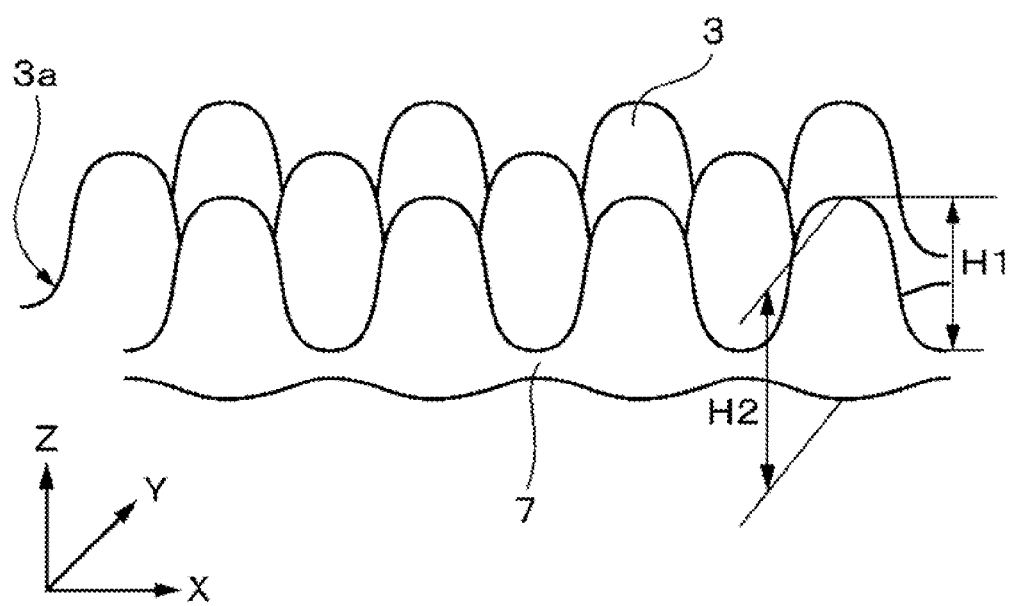
FIG. 2 is an enlarged perspective view showing part of the optical element shown in FIG. 1A.
Figure 3:
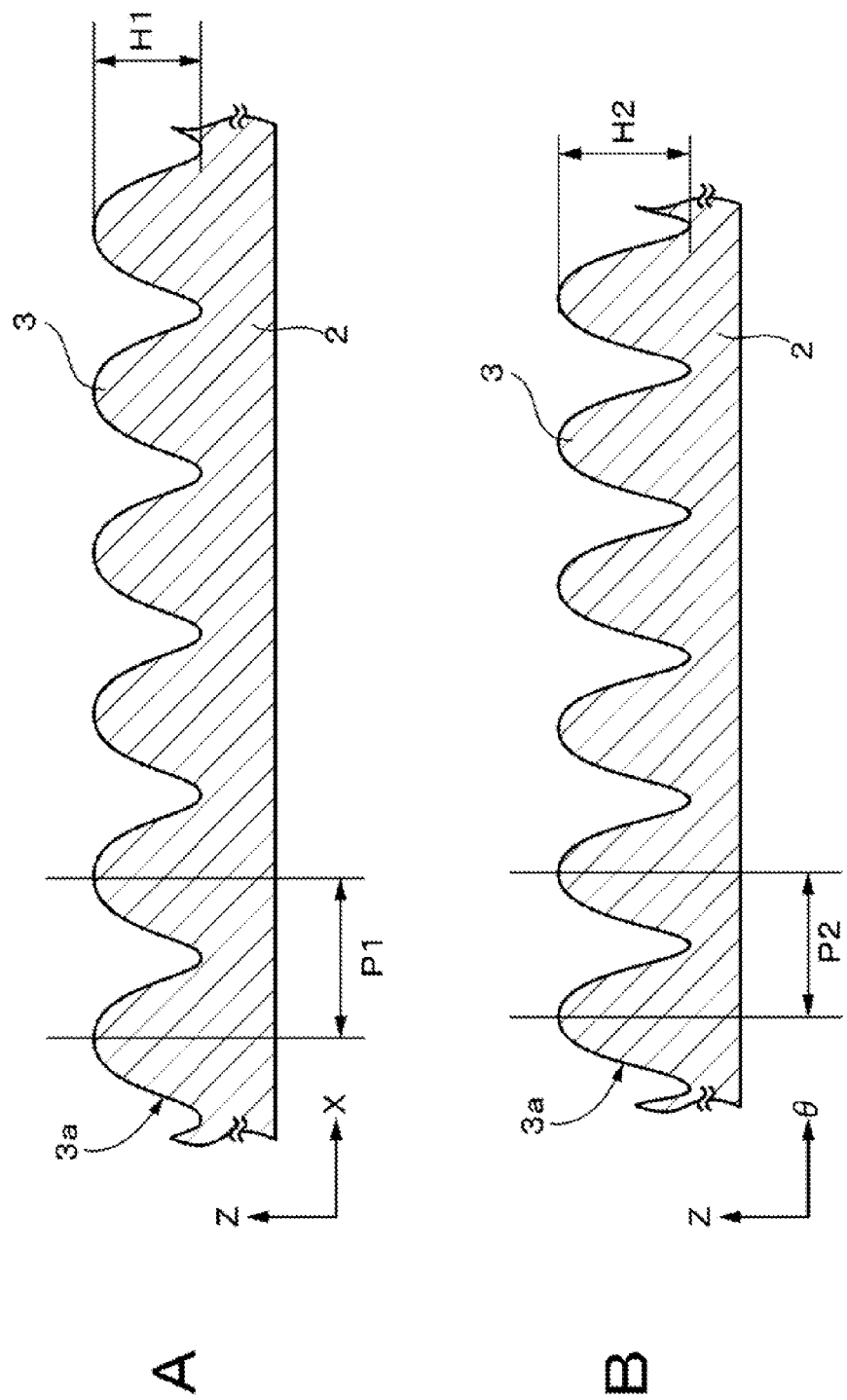
FIG. 3A is a cross-sectional view of the optical element shown in FIG. 1A in a track extending direction.
FIG. 3B is a cross-sectional view of the optical element 1 shown in FIG. 1A in a θ direction.
Figure 4:
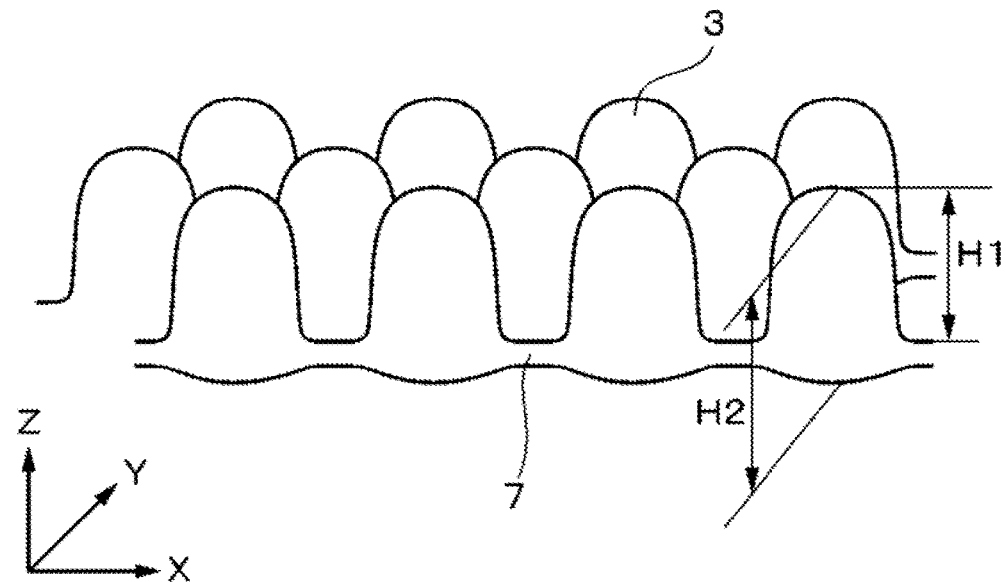
FIG. 4 is an enlarged perspective view showing part of the optical element 1 shown in FIG. 1A.
Figure 5:
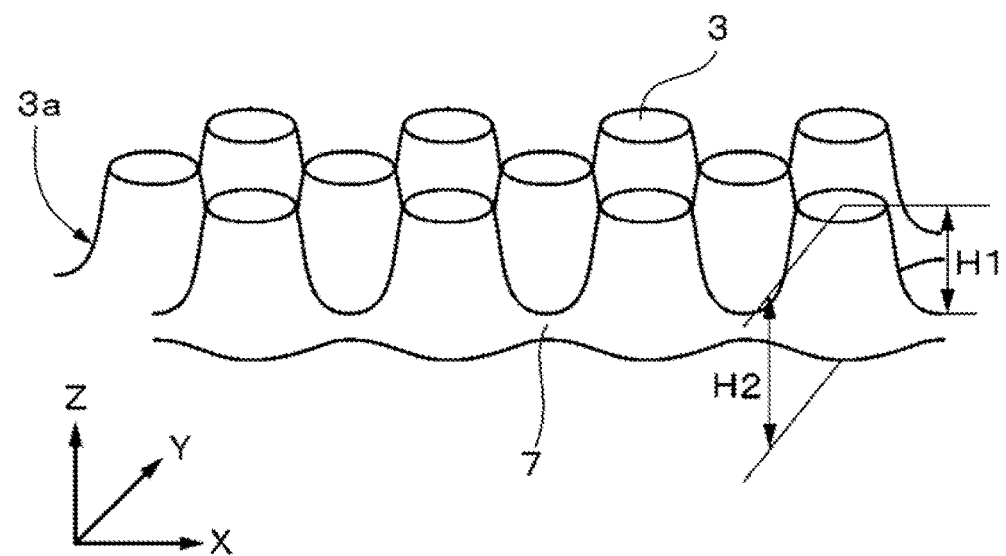
FIG. 5 is an enlarged, perspective view showing part of the optical element 1 shown in FIG. 1A.

It is preferable that the structures 3 have an elliptical cone shape in which the bottom is an elliptical, oblong, or oval shape having a long axis and a short axis, and the top portion is curved, as shown in FIGS. 2 and 4. Alternatively, it is preferable that the structures 3 have an elliptical frustum shape in which the bottom is an elliptical, oblong, or oval shape having a long axis and a short axis, and the top portion is flat, as shown in FIG. 5. This is because such shapes can improve the packing density in the row direction.

From the viewpoint of improvement in reflection characteristics, it is preferable that the conical shape have a gentle slope at the top portion and a gradual steep slope from the middle portion to the bottom, portion (see FIG. 4). Further, from the viewpoint of improvement in reflection characteristics and transmission characteristics, it is preferable that the conical shape have a slope at the middle portion steeper than the slopes at the bottom portion and the top portion (see FIG. 2), or a flat top portion (see FIG. 5). When the structures 3 have an elliptical cone shape or an elliptical frustum shape, it is preferable that the long axis direction of the bottom face be parallel to the track extending direction. In FIG. 2 and the like, the structures 3 each have the same shape. The shapes of the structures 3 are not limited to the shown shapes. On the surface of the base material, the structures 3 having two hinds or more of shapes may be formed. The structures 3 may be integrally formed with the base material 2.

Figure 6:
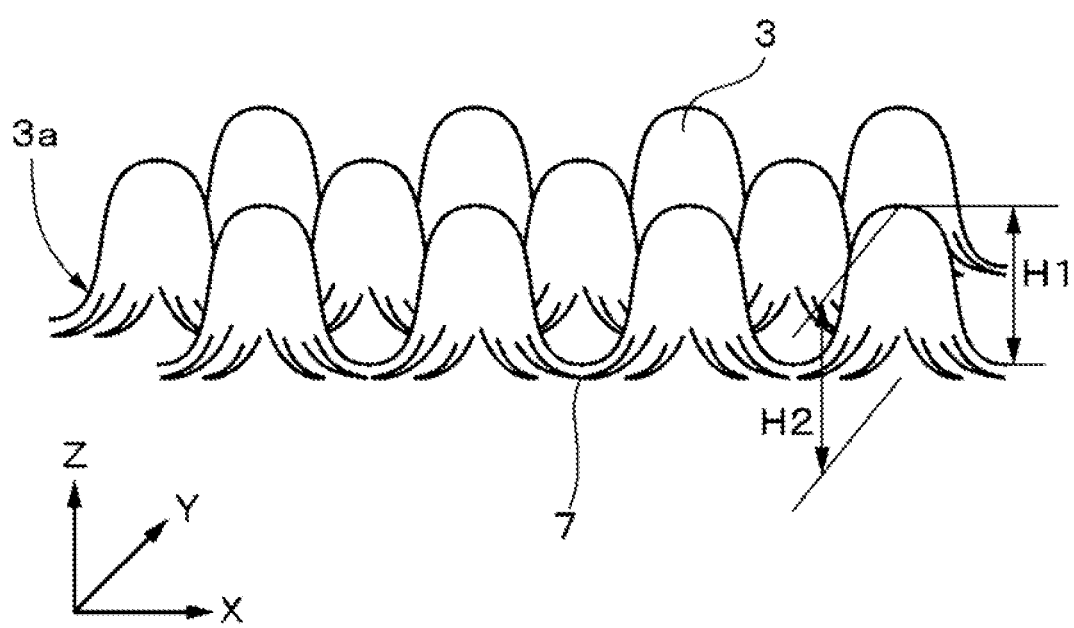
FIG. 6 is an enlarged perspective view showing part of the optical element 1 shown in FIG. 1A.

Further, as shown in FIGS. 2, 4 to 6, it is preferable that a protrusion portion 7 be provided at part or all of the surroundings of the structures 3. This is because such a configuration can reduce the reflectance even when the packing factor of the structures 3 is low. For example, the protrusion portion 7 is provided between the adjacent structures 3, as shown in FIGS. 2, 4, and 5, Further, as shown in FIG. 6, an elongated protrusion portion 7 may be provided at part or all of the surroundings of the structures 3. For example, the elongated protrusion portion 7 extends in the direction from the top portion of each structure 3 to the lower portion thereof. Examples of the shape of the protrusion portion 7 include, but not particularly limited to, a shape having a triangular cross section and a shape having a square cross section. In consideration of easiness of molding, the shape can be selected as appropriate. Further, the surface of part or all of the surroundings of the structures 3 may be made roughened to form a fine concavo-convex shape. For example, the surface between the adjacent structures 3 may be made roughened to form a fine concavo-convex shape. Moreover, a very small hole may be formed in the surface of each structure 3, for example, in the top portion.

The structures 3 are not limited to a convex portion shape shown in the drawing, and may include a concave portion formed on the surface of the base material 2. The height of the structures 3 is not particularly limited, and is about 420 nm, and specifically 415 nm to 421 nm. When the structures 3 are shaped into concave portions, the depth of the structures 3 is defined correspondingly.

It is preferable that the height H1 of the structures 3 in the track extending direction be lower than the height H2 of the structures 3 in the row direction. More specifically, it is preferable that the heights H1 and H2 of the structures 3 satisfy the relationship of H1<H3. When the structures 3 are arranged to satisfy the relationship of H1≥H2, the arrangement pitch P1 in the track extending direction is required to be set long. This is because the packing factor of the structures 3 in the track extending direction is decreased. Such a decrease in the packing factor may reduce the reflection characteristics.

Further, it is not requisite that all the structures 3 have the same aspect ratio, and each structure 3 may have a certain height distribution (for example, an aspect ratio in a range of from, about 0.83 to 1.46). When the structures 3 have a certain height distribution, the wavelength dependency of the reflectance characteristics can be reduced. Therefore, an optical element 1 having excellent anti-reflection characteristics can be realized.

The height distribution used herein means that structures 3 having two kinds or more of heights (depths) are provided on the surface of the base material 2. In other words, it means that structures 3 having the height serving as a reference and other structures 3 having the height different from the reference height are provided on the surface of a base material 2. The structures 3 having the height different from the reference height are provided, for example, on the surface of the base material 2 periodically or aperiodically (random). Examples of a direction of the periodicity include an extending direction and a row direction of the tracks.

It is preferable that a flare portion 3a be provided in a peripheral portion of each structure 3. This is because the optical element can be easily removed from a mold, or the like, in a process for manufacturing an optical element. The flare portion 3a used herein means a protrusion portion provided in the peripheral portion of the bottom portion of the structure 3. From the viewpoint of the release characteristics, the flare portion 3a preferably has a gently inclined carved surface in a direction from the top portion of the structure 3 to the lower portion. Further, the flare portion 3a may be provided only on part of the peripheral portion of the structure 3. From the viewpoint of improvement of the release characteristics, the flare portion 3a is preferably provided on all the peripheral portion of the structure 3. When the structures 3 are concave portions, the flare portions are each a curved surface provided on the peripheral portion of concave opening which is each of the structures 3.

The height (depth) of the structures 3 is not particularly limited, and may be appropriately set according to the wavelength range of light to be passed through, for example, in a range of about 236 nm to 450 nm. The aspect ratio (height/arrangement pitch) of the structures 3 falls within a range of 0.6 or more and 5 or less, preferably 0.81 or more and 1.46 or less, and more preferably 0.94 or more and 1.28 or less. When the aspect ratio is less than 0.6, the reflection characteristics and transmission characteristics tend to be reduced. When it exceeds 5, a release characteristic of the structures 3 is reduced in a process for manufacturing an optical element 1. Thus, a duplication of a replica tends to be worsened.

From the viewpoint of more improvement of the reflection characteristics, the aspect ratio of the structures 3 is preferably set within a range of 0.94 to 1.46. Further, from the viewpoint of more improvement of the transmission characteristics, the aspect ratio of the structures 3 is preferably set within a range of 0.81 to 1.28.

The elastic modulus of the material forming the structures 3 is 1 MPa or more and 1200 MPa or less, and preferably 5 MPa or more and 1200 MPa or less. When the elastic modulus is less than 1 MPa, the adjacent structures adhere to each other in a transcription process. The shape of the structures 3 is different from the desired shape, and therefore the desired reflection characteristics cannot be obtained. When it exceeds 1200 MPa, the structures 3 are unlikely to be deformed in wiping.

The surface of the optical element 1 on which the structures 3 are formed is hydrophilic. The water contact angle on the hydrophilic surface of the optical element 1 is preferably 110° or less, and more preferably 30° or less.

The aspect ratio in the present technology is defined by the following expression (1).

$$\text{Aspect ratio} = H/P \quad (1)$$

wherein H is the height of a structure and P is an average arrangement pitch (average period).

The average arrangement pitch P used herein is defined by the following expression (2).

$$\text{Average arrangement pitch } P = (P1 + P2 + P2)/3 \quad (2)$$

wherein P1 is the arrangement pitch in the track extending direction (track extending direction period) and P2 is the arrangement pitch in a ±θ direction to the track extending direction (wherein θ=60°−δ, δ used here is preferably set in a range of 0°<δ≤11°, and more preferably 3°≤δ≤6°) (θ direction period).

Further, the height H of the structures 3 is a height in the row direction of the structures 3. Since the height of the structures 3 in the track extending direction (X direction) is lower than the height in the row direction (Y direction) and the height of a portion other than a portion in the track extending direction of the structures 3 is substantially the same as the height in the row direction, the height of the sub-wavelength structures is represented by the height in the row direction. However, when the structures 3 are concave portions, the height H of the structure in the above expression (1) is defined as the depth H of the structure.

The ratio P1/P2 of the arrangement pitch P1 of the structures 3 on the same track to the arrangement pitch P2 of the structures 3 between the adjacent two tracks preferably satisfies a relationship of 1.00≤P1/P2≤1.1 or 1.00<P1/P2≤1.1. In such a numerical range, the packing factor of the structures 3 having an elliptical cone shape or an elliptical frustum shape can be improved. Therefore, the anti-reflection characteristics can be improved.

The packing factor of the structures 3 in the surface of the base material has an upper limit of 100%, and is within a range of 65% or more, preferably 73% or more, and more preferably 86% or more. The packing factor set within such a range can improve the anti-reflection characteristics. In order to improve the packing factor, it is preferable that the structures 3 be distorted by bonding the lower portions of the adjacent structures 3 or by adjusting the ellipticity of the bottom face of each structure.

The packing factor (average packing factor) of the structures 3 used herein is a value calculated as follows.

The surface of the optical element 1 is first photographed from the top view with a scanning electron microscope (SEM). Subsequently, a unit lattice Uc is randomly selected from the photographed SEM photographs, and the arrangement pitch P1 and track pitch Tp of the unit lattice Uc are measured (see FIG. 1B). The area S of the bottom face of the structure 3 positioned in the center of the unit lattice Uc is measured by image processing. The packing factor is then calculated using the measured arrangement pitch P1, track pitch Tp, and area S of the bottom face in the following expression (3).

$$\text{Packing factor} = (S(\text{hex.})/S(\text{unit})) \times 100 \quad (3)$$

Unit lattice area: $S(\text{unit}) = P1 \times 2Tp$

Area of bottom face of structure in unit lattice: $S(\text{hex.}) = 2S$

In the unit lattices at 10 points selected randomly from the SEM photographs, the calculation of packing factor is performed as described above. The measured values are simply averaged (mathematically) to determine an average packing factor, which is a packing factor of the structures 3 in the surface of the base material.

When the structures 3 are overlapped or a sub-structure such as a protrusion portion 7 exists between the structures 3, the packing factor can be calculated by a method of determining an area ratio using as a threshold value a part corresponding to the height which is 5% of the height of the structures 3.

Figure 7:
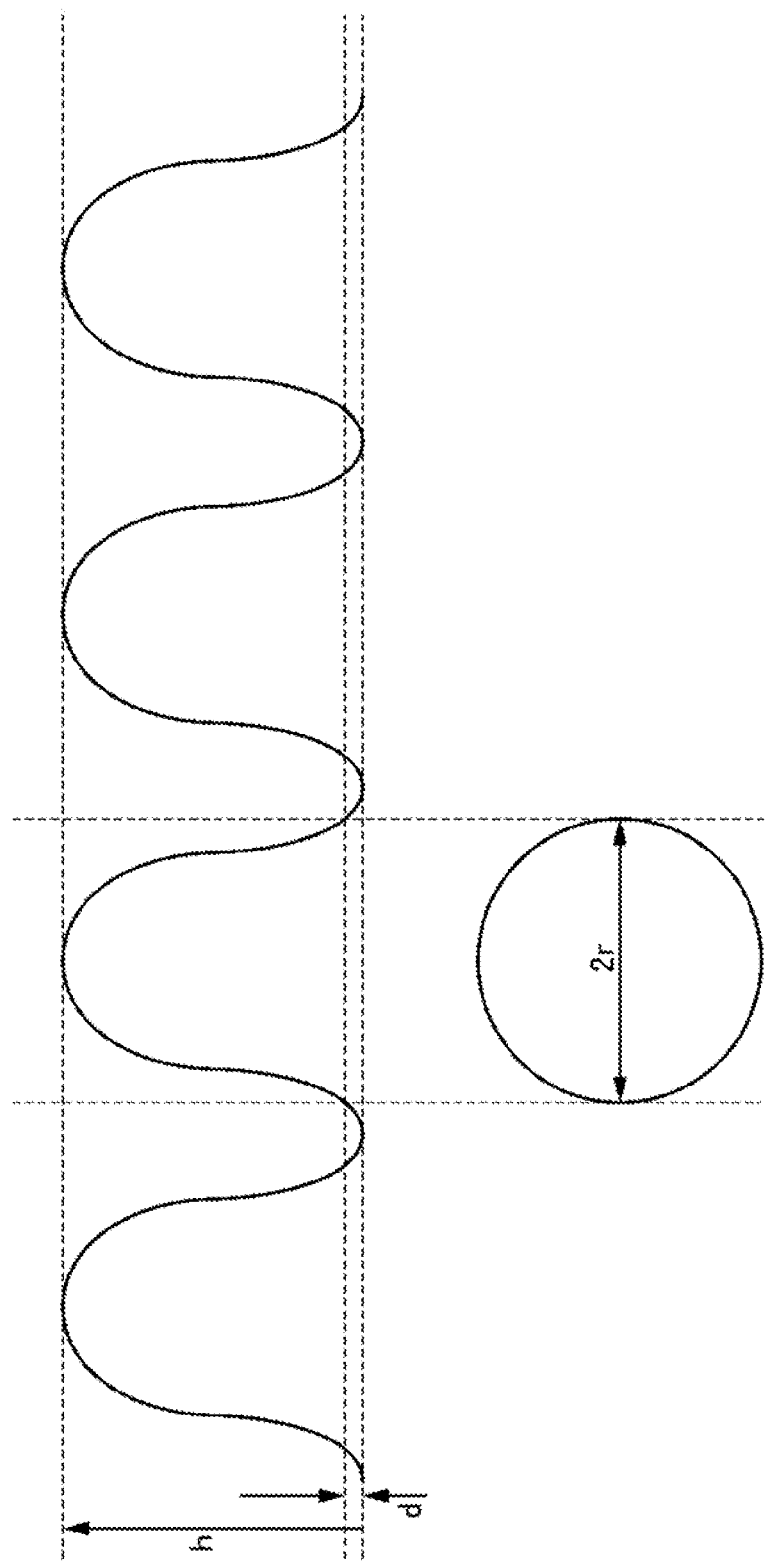
FIG. 7 is a diagram for illustrating a method for setting a bottom face of a structure when the boundary of the structure is unclear.

FIG. 7 is a diagram for illustrating a method for calculating a packing factor when the boundary of the structures 3 is unclear. When the boundary of the structures 3 is unclear, a part corresponding to 5% of the height h of the structures 3 (=(d/h)×100) is obtained as a threshold value by observation of the cross-section SEM as shown in FIG. 7. The radius of the structures 3 is then calculated using the height d, and the packing factor is obtained. When the bottom face of the structures 3 is ellipse, the major axis and the minor axis are subjected to the same processing.

Figure 8:
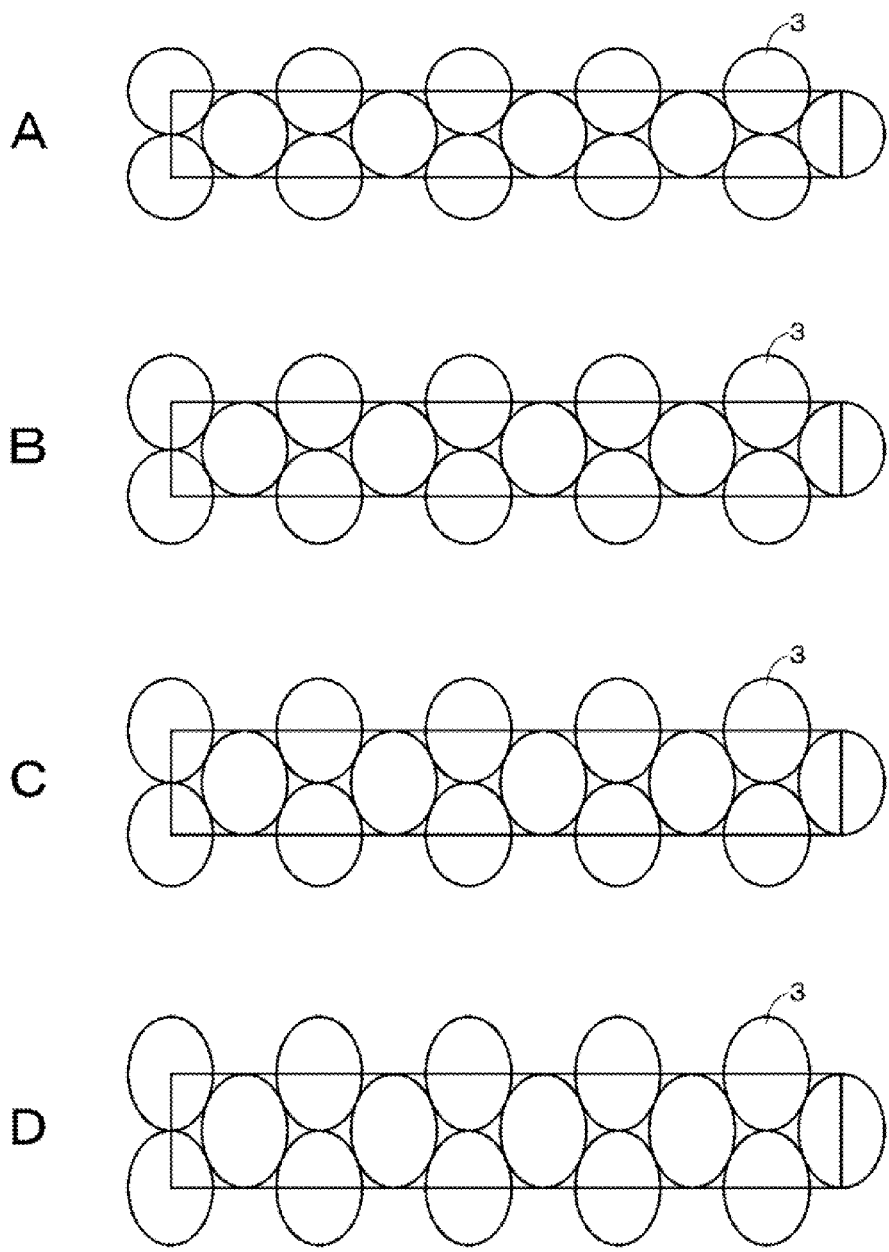
FIG. 8A is a view showing the shape of bottom faces of the structures when the ellipticity of the bottom faces is changed.
FIG. 8B is a view showing the shape of bottom faces of the structures when the ellipticity of the bottom faces is changed.
FIG. 8C is a view snowing the shape of bottom faces of the structures when the ellipticity of the bottom faces is changed.
FIG. 8D is a view showing the shape of bottom faces of the structures when the ellipticity of the bottom faces is changed.

FIG. 8 is a view showing the shape of a bottom face of the structures 3 when the ellipticity of the bottom faces is changed. The ellipticities of ellipses shown in FIGS. 8A to 8D are 100%, 110%, 120%, and 141%, respectively. When the ellipticity is thus changed, the packing factor of the structures 3 in the surface of the base material can be changed. When a quasi-hexagonal lattice pattern is formed from the structures 3, the ellipticity e of bottom face of the structures is preferably 100%<e<150% or lower. This is because such a range can improve the packing factor of the structures 3 and excellent anti-reflective characteristics can be obtained.

The ellipticity e used herein is defined by (a/b)×100, wherein a is a radius of bottom faces of the structures in a track direction (X direction) and b is a radius thereof in a row direction (Y direction) perpendicular to the track direction. The radiuses a and b of the structures 3 are values calculated as follows. The surface of the optical element 1 is photographed from the top view with a scanning electron microscope (SEM). Ten structures 3 are randomly extracted from the photographed SEM photographs. The radiuses a and b of bottom face of each of the extracted structures 3 are measured. The measured values a and b are each simply averaged (arithmetically averaged) to determine average values of radius a and b, which serve as the radiuses a and b of structures 3.

Figure 9:
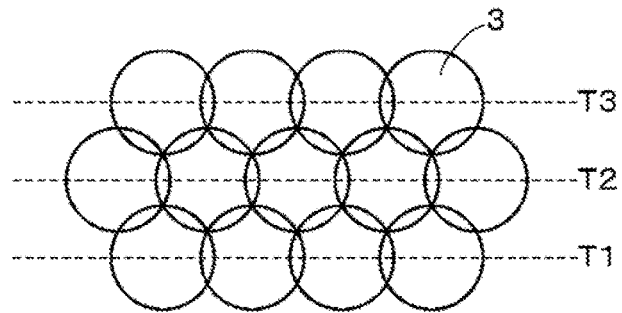
FIG. 9A is a view showing one example of the arrangement of the cone-shaped or frustum-shaped structures.
FIG. 9B is a view showing one example of the arrangement of the elliptical cone-shaped or elliptical frustum-shaped structures 3.
Figure 9:
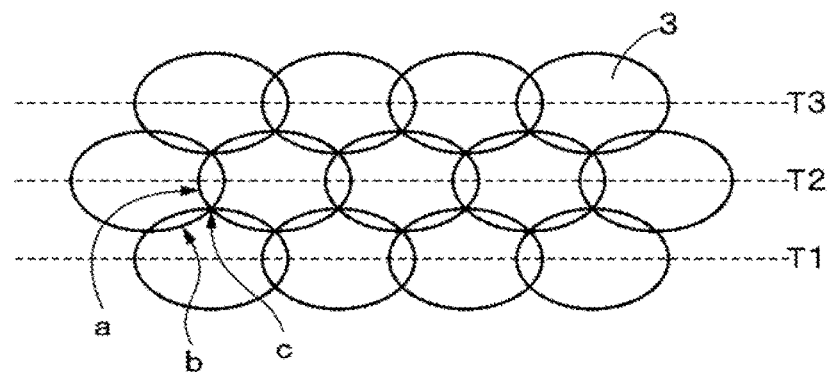

FIG. 9A is a view showing one example of the arrangement of cone-shaped or frustum-shaped structures 3. FIG. 9B is a view showing one example of the arrangement of elliptical cone-shaped or elliptical frustum-shaped structures 3. As shown in FIGS. 9A and 9B, the structures 3 are preferably bonded to each other so that the lower portions are overlapped. Specifically, it is preferable that the lower portions of the structures 3 be bonded to part or all of the lower portions of the adjacent structures 3. More specifically, it is preferable that the lower portions of the structures 3 be bonded to each other in the track direction, in the θ direction, or in both directions. More specifically, it is preferable that the lower portions of the structures 3 be bonded to each other in the track direction, in the θ direction, or in both directions. FIGS. 9A and 9B show examples in which all the lower portions of the adjacent structures 3 are bonded. When the structures 3 are thus bonded, the packing factor of the structures 3 can be improved. It is preferable that the structures be bonded at a portion which is at or below a quarter of the maximum wavelength band of light at such an optical path length that a refractive index is considered under use environment. Thus, excellent anti-reflective characteristics can be obtained.

As shown in FIG. 9B, when the lower portions of the elliptical cone-shaped or elliptical frustum-shaped structures 3 are bonded to each other, the heights of the bonding portions are lower, for example, in the order of the bonding portions a, b, and c.

The ratio ((2r/P1)×100) of the diameter 2r to the arrangement pitch P1 is 85% or more, preferably 90% or more, and more preferably 95% or more. This is because such a range can improve the packing factor of the structures 3 and excellent anti-reflective characteristics can be obtained. When the ratio ((2r/P1)×100) is large and the overlap of the structures 3 is too large, the anti-reflective characteristics tend to be lower. It is preferable that the upper limit of the ratio ((2r/P1)×100) be set so that the structures are bonded to each other at a portion which is at or below a quarter of the maximum wavelength band of light at such an optical path length that a refractive index is considered under use environment. The arrangement pitch P1 used herein is an arrangement pitch in the track direction of the structures 3. The diameter 2r used herein is a diameter in the track direction of bottom faces of the structures 3. When the bottom face of the structure is a circle, 2r is a diameter, and when it is an ellipse, 2r is a major axis.

[Configuration of Roll Master]

Figure 10:
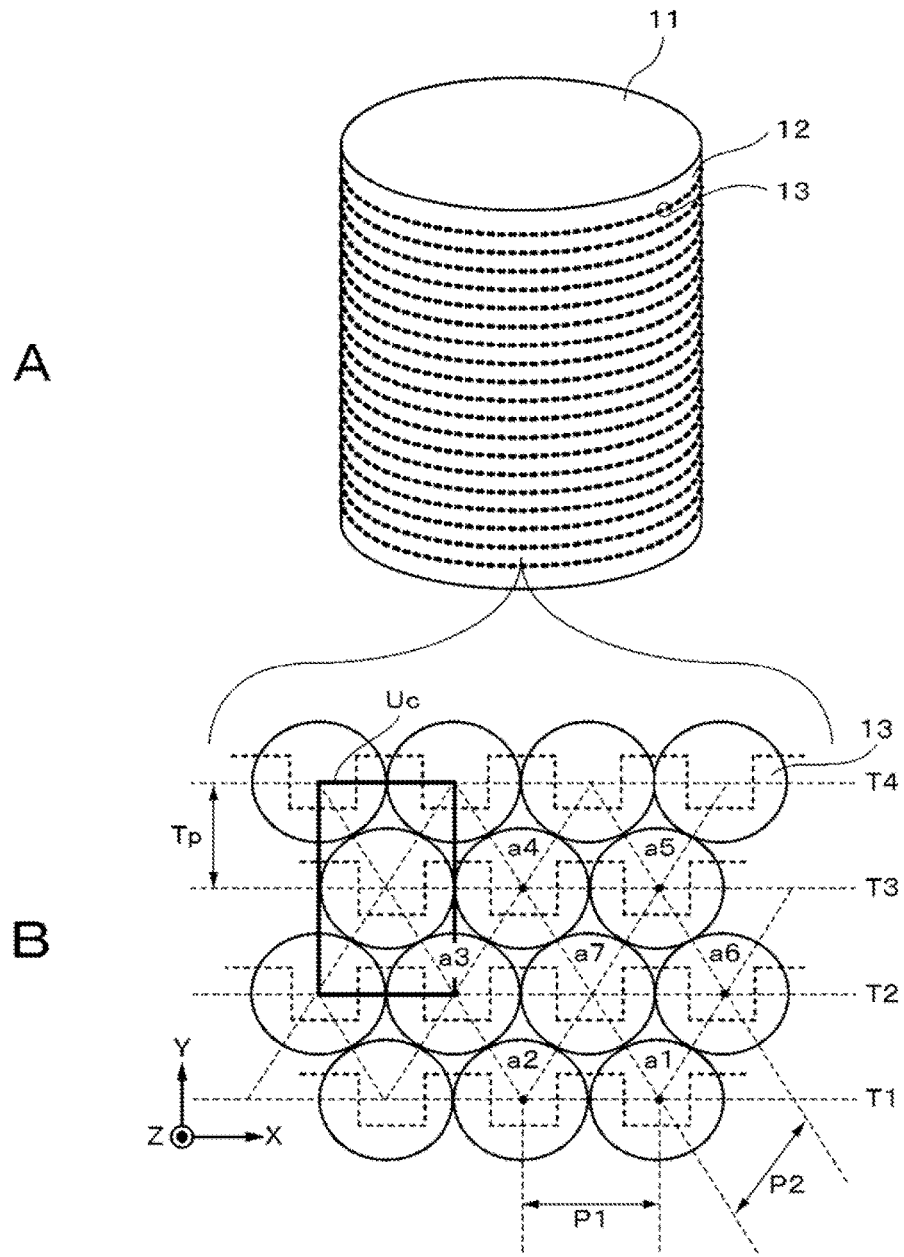
FIG. 10A is a perspective view showing one example of the configuration of a roll master for manufacturing an optical element.
FIG. 10B is an enlarged plan view showing part of the molding surface of the roll master shown in FIG. 10A.

FIG. 10A is a perspective view showing one example of the configuration of a roll master for manufacturing an optical element. FIG. 10B is an enlarged plan view showing part of the molding surface of the roll master shown in FIG. 10A. As shown in FIGS. 10A and 10B, a roll master 11 is configured so that, for example, a large number of structures 13 which are concave portions are arranged on the surface of a master 12 at a pitch equal to the wavelength of light such as visible light. The master 12 has a columnar shape or a cylindrical shape. For example, glass can be used as the material for the master 12. However, the material is not particularly limited thereto. By using a roll master exposure device described below, two-dimensional patterns are spatially linked, a polarity reverse formatter signal is synchronized with a rotation controller of a recorder so that a signal is generated at every track, and a pattern is formed at CAV and an appropriate feeding pitch. Thus, a hexagonal lattice pattern or a quasi-hexagonal lattice pattern can be recorded. The frequency of the polarity reverse formatter signal and the rotation number of the roll are set properly to form a lattice pattern which has a uniform spatial frequency in a desired record region.

[Method for Manufacturing Optical Element]

Next, a method for manufacturing the optical element 1 configured as described above will be described with reference to FIGS. 11, and 12A to 13C.

The method for manufacturing the optical element according to the first embodiment includes a resist film forming step of forming a resist layer on a master, an exposure step of forming a latent image of a moth eye pattern on the resist film with a roll master exposure device, and a development step of developing the resist layer on which a latent image has been formed. Further, the method includes an etching step of manufacturing a roll master by plasma etching, and a replication step of manufacturing a replica substrate from an ultraviolet curable resin.

(Configuration of Exposure Device)

Figure 11:
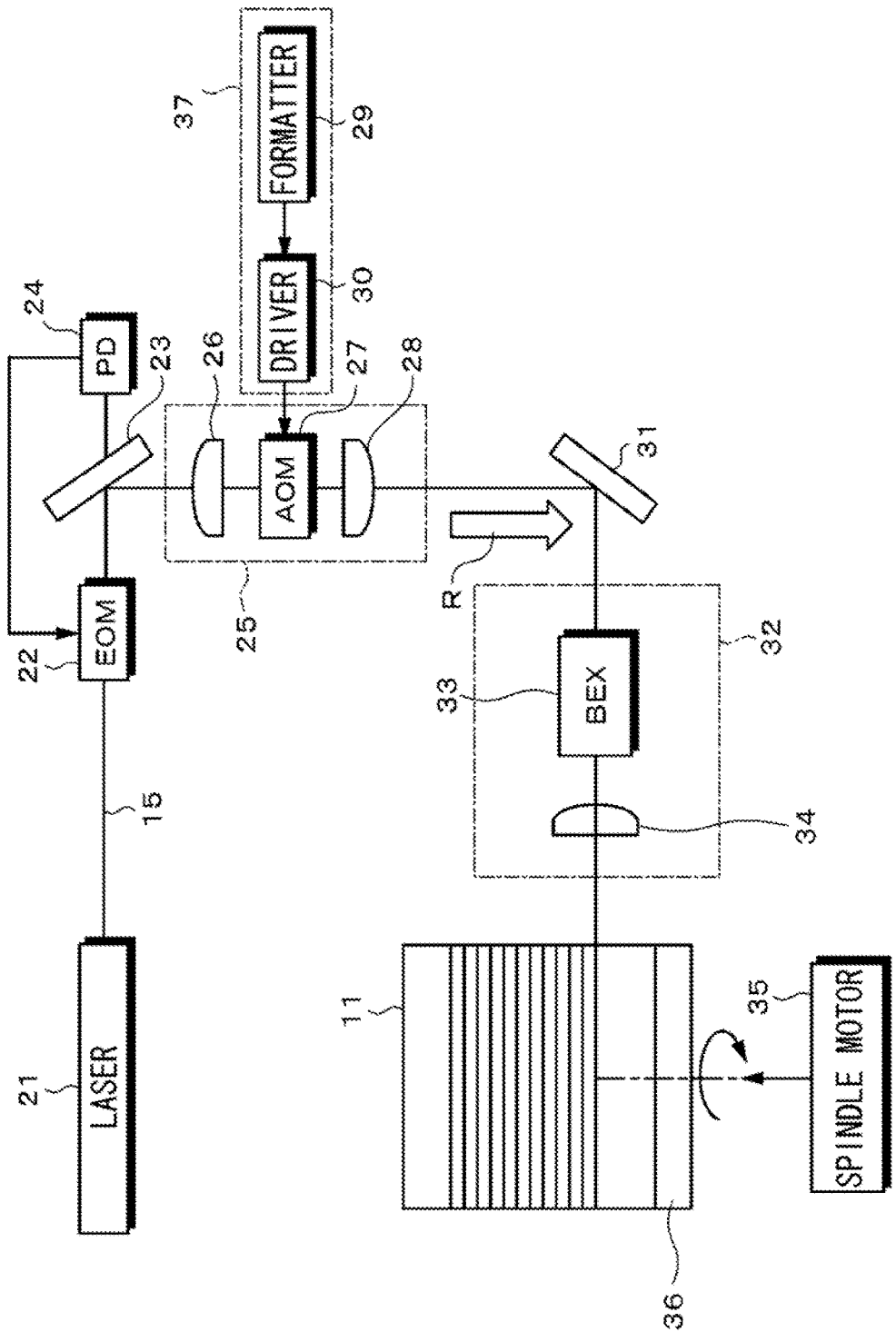
FIG. 11 is a schematic view showing one example of the configuration of a roll master exposure device.
Figure 12:
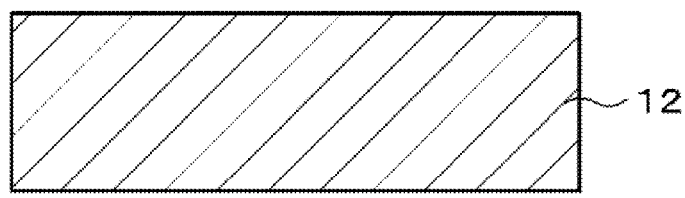
FIG. 12A is a process chart for illustrating a method for manufacturing the optical element according to the first embodiment of the present technology.
FIG. 12B is a process chart for illustrating a method for manufacturing the optical element according to the first embodiment of the present technology.
FIG. 12C is a process chart for illustrating the method for manufacturing the optical element according to the first embodiment of the present technology.
Figure 12:
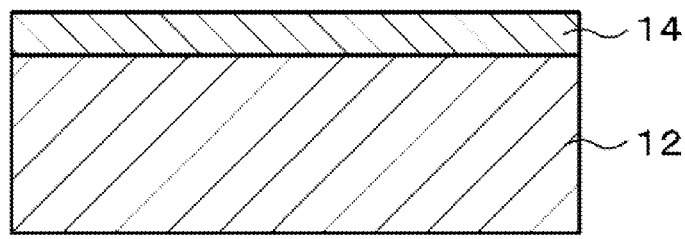
Figure 12:
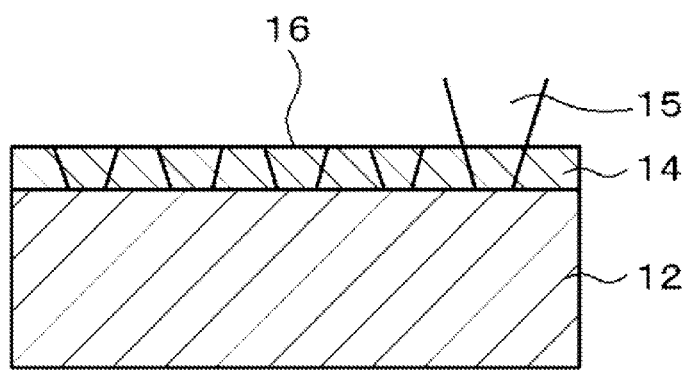
Figure 13:
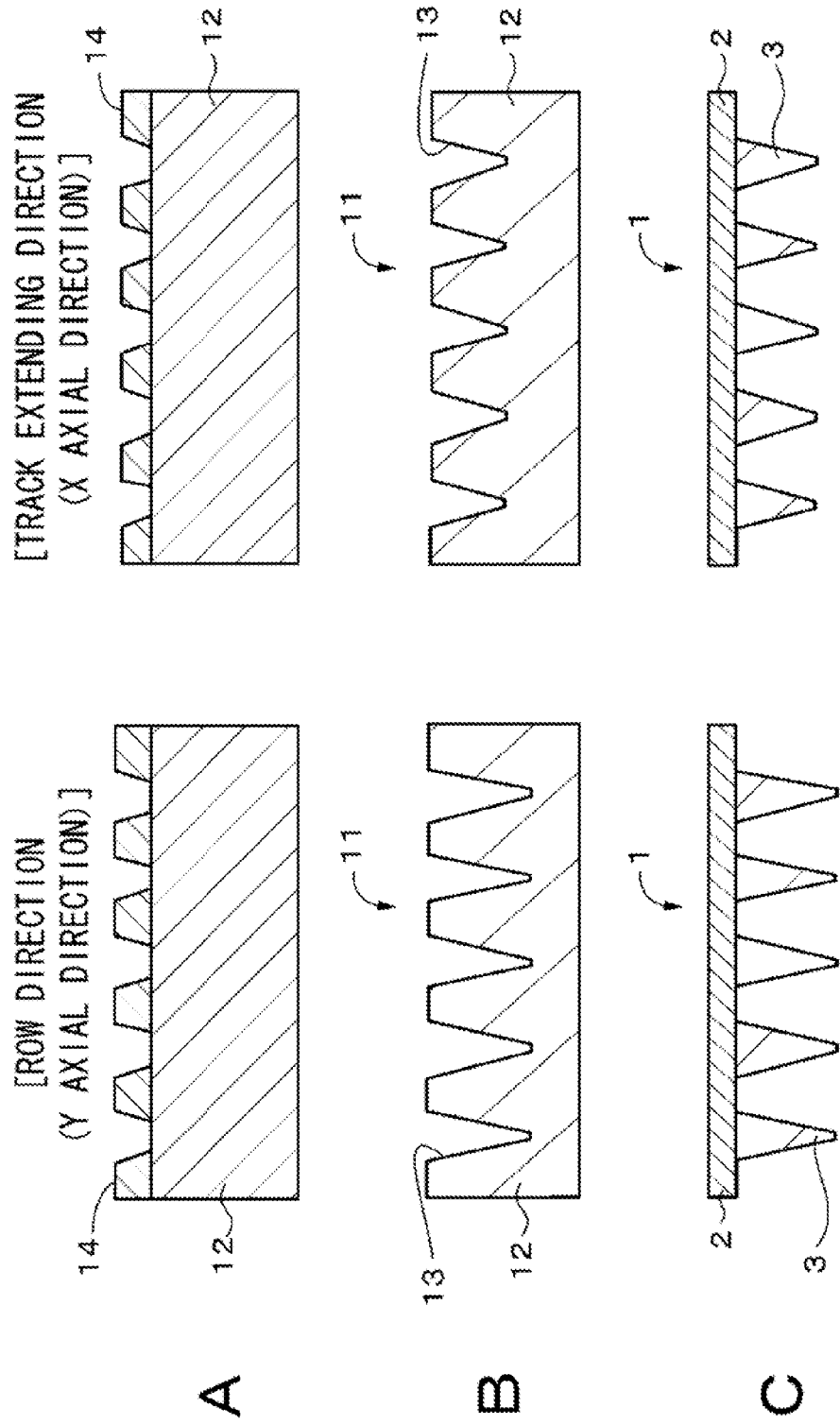
FIG. 13A is a process chart for illustrating a method for manufacturing the optical element according to the first embodiment of the present technology.
FIG. 13B is a process chart for illustrating a method for manufacturing the optical element according to the first embodiment of the present technology.
FIG. 13C is a process chart for illustrating a method for manufacturing the optical element according to the first embodiment of the present technology.

The configuration of the roll master exposure device used in the exposure step of a moth eye pattern will be described with reference to FIG. 11. The roll master exposure device is configured on the basis of an optical disk recorder.

A laser light source 21 is a light source for exposure of a resist formed on the surface of the master 12 as a record medium, and, for example, oscillates a record laser beam 15 having a wavelength λ of 266 nm. The laser beam 15 emitted from the laser light source 21 travels in a straight line as a parallel beam, and enters an electro optical element 22 (EOM: electro optical modulator). The laser beam 15 transmitted through the electro optical element 22 is reflected by a mirror 23 and is introduced to a modulation optical system 25.

The mirror 23 includes a polarizing beam splitter, and has a function of reflecting one polarized component and transmitting the other polarized component. The polarized component transmitted through the mirror 23 is received at a photodiode 24, and the electro optical modulator 22 is controlled in response to a received signal to perform phase modulation of the laser beam 15.

In the modulation optical system 25, the laser beam 15 is converged by a condenser 26 to an acousto-optic element 27 (AOM: acousto-optic element) made of glass ($SiO_2$) or the like. The laser beam 15 is intensity-modulated by the acousto-optic element 27 and dispersed, and then collimated by a lens 28. The laser beam 15 emitted from the modulation optical system 25 is reflected by a mirror 31, and is introduced on a moving optical table 32 as a horizontal and parallel beam.

The moving optical table 32 includes a beam expander 33 and an objective lens 34. The laser beam 15 introduced to the moving optical table 32 is shaped into a desired beam form by the beam expander 33, and is then irradiated to the resist layer on the master 12 through the objective lens 34. The master 12 is placed on a turntable 36 connected to a spindle motor 35. Further, while the master 12 is rotated and the laser beam 15 is moved in the height direction of the master 12, the resist layer is intermittently irradiated with the laser beam 15 to perform the exposure step of the resist layer. The formed latent image has a substantially elliptical shape having a major axis in the circumferential direction. The laser beam 15 is moved by shifting the moving optical table 32 in the direction indicated by an arrow R.

An exposure device has a control mechanism 37 for forming the latent image corresponding to the 2-dimensional pattern of hexagonal lattice or quasi-hexagonal lattice shown in FIG. 1B in the resist layer. The control mechanism 37 has a formatter 29 and a driver 30. The formatter 29 includes a polarity inversion unit, which controls timing of irradiation of the resist layer with the laser beam 15. The driver 30 controls the acoust-optic modulator 27 in response to an output by the polarity inversion unit.

The roll master exposure device synchronizes a polarity reverse formatter signal with a rotation controller of a recorder at every track so that two-dimensional patterns are spatially linked, and generates a signal. Further, intensity modulation is performed by the acoust-optic modulator 27. By patterning at a constant angular velocity (CAV), an appropriate rotation number, an appropriate modulation frequency, and an appropriate feeding pitch, a hexagonal lattice pattern or a quasi-hexagonal lattice pattern can be recorded. For example, in order to achieve a period in the circumferential direction of 315 nm and a period in the direction at about 60° to the circumferential direction (about −60° direction) of 300 nm, as shown in FIG. 10B, the feeding pitch may be set to 251 nm (Pythagorean theorem). The frequency of the polarity reverse formatter signal is changed according to the rotation number of the roll (for example, 1800 rpm, 900 rpm, 450 rpm, and 225 rpm). The frequency of the polarity reverse formatter signal corresponding to a rotation number of the roll of 1800 rpm, 900 rpm, 450 rpm, or 225 rpm, is 37.70 MHz, 18.85 MHz, 9.34 MHz, or 4.71 MHz, respectively. A quasi-hexagonal lattice pattern having an uniform spatial frequency (period: 315 nm in the circumference, period in the direction at about 60° to the circumferential direction (about −60° direction): 300 nm) formed in a desired record region is obtained by enlarging far-ultraviolet beam on the moving optical table 32 into a 5-fold beam radius by a beam expander (BEX) 33, irradiating the resist layer on the master 12 through the objective lens 34 with a numerical aperture (NA) of 0.9, and forming a fine latent image.

(Resist Film Forming Step)

First, as shown in FIG. 12A, a columnar master 12 is prepared. The master 12 is, for example, a glass master. Then, as shown in FIG. 12B, a resist layer 14 is formed on the surface of the master 12. As the material for the resist layer 14, for example, an organic resist or an inorganic resist may be used. As an organic resist, for example, a novolac resist or a chemically amplifying type resist can be used.

(Exposure Step)

As shown in FIG. 12C, while the master 12 is rotated with the roll master exposure device, the resist layer 14 is irradiated with the laser beam (exposure beam) 15. In this case, the resist layer 14 is intermittently irradiated with the laser beam 15 while the laser beam 15 is moving in the height direction of the master 12 (in the direction parallel to the central axis of the columnar or cylindrical master 12), whereby the entire surface of the resist layer 14 is exposed. Thus, a latent image 16 in accordance with the trajectory of the laser beam 15 is formed on the entire surface of the resist layer 14 at a pitch equivalent to the wavelength of visible light.

For example, the latent image 16 is arranged so that a plurality of track rows are formed on the surface of the master and a hexagonal lattice pattern or a quasi-hexagonal lattice pattern is formed. Further, the latent image 16 has, for example, an elliptical shape having a long axis direction along the track extending direction.

(Development Step)

Next, while the master 12 is rotated, a developer is applied dropwise to the resist layer 14 to develop the resist layer 14 as shown in FIG. 13A. As shown in the drawing, when the resist layer 14 is formed from a positive type resist, the dissolution speed of a portion exposed to the laser beam 15 with respect to the developer is higher than that of an unexposed portion. Therefore, a pattern in accordance with the latent image (exposed portion) 16 is formed in the resist layer 14.

(Etching Step)

The surface of the master 12 is etched using the pattern of the resist layer 14 (resist pattern) formed on the master 12 as a mask. Thus, concave portions in the form of an elliptical cone or an elliptical frustum, having a long axis direction along the track extending direction, that is, structures 13 can be obtained as shown in FIG. 13B. The etching is conducted by dry etching, for example. In this case, when the etching process and an ashing process are alternately performed, for example, a pattern of conical structures 13 can be formed. A glass master having a depth three times or more of the resist layer 14 (selective ratio: 3 or more) can be produced to realize increased aspect ratio of the structures 3. The dry etching is preferably plasma etching using a roll etching device. The roll etching device is a plasma etching device having a columnar electrode, which is configured so that the columnar electrode is inserted in a cavity of the cylindrical master 12 and the columnar surface of the master 12 is subjected to plasma etching.

As described above, a roll master 11 in a concave hexagonal lattice pattern or a quasi-hexagonal lattice pattern, having a depth of about 120 nm to about 350 nm can be obtained.

(Replication Step)

Next, for example, the roll master 11 is caused to adhere to a base material 2 such as a sheet coated with a transcription material, and is separated while it is cured by ultraviolet irradiation. Thus, as shown in FIG. 13C, a plurality of structures which are convex portions are formed on a first main surface of the base material 2. An optical element 1 such as a moth eye ultraviolet curing replication sheet is produced.

The transcription material includes, for example, an ultraviolet curing material, an initiator, and if necessary, a filler, and a functional additive.

The ultraviolet curing material includes, for example, a monofunctional monomer, a difunctional monomer, a multifunctional monomer, and a macromolecular oligomer, and specifically includes the following materials alone or in a mixture of two or more thereof.

Examples of the monofunctional monomer may include carboxylic acids (acrylic acid), hydroxy compounds (2-hydroxyethyl acrylate, 2-hydroxypropyl acrylate, and 4-hydroxybutyl acrylate), an alkyl, alicyclic compounds (isobutyl acrylate, tert-butyl acrylate, isooctyl acrylate, lauryl acrylate, stearyl acrylate, isobornyl acrylate, and cyclohexyl acrylate), other functional monomers (2-methoxyethyl acrylate, methoxyethylene glycol acrylate, 2-ethoxyethyl acrylate, tetrahydrofurfuryl acrylate, benzyl acrylate, ethyl carbitol acrylate, phenoxyethyl acrylate, N,N-dimethylaminoethyl acrylate, N,N-dimethylaminopropylacrylamide, N,N-dimethylacrylamide, acryloylmorpholine, N-isopropylacrylamide, N,N-diethylacrylamide, N-vinylpyrrolidone, 2-(perfluorooctyl)ethyl acrylate, 3-perfluorohexyl-2-hydroxypropyl acrylate, 3-perfluorooctyl-2-hydroxypropyl acrylate, 2-(perfluorodecyl) ethyl acrylate, 2-(perfluoro-3-methylbutyl)ethyl acrylate), 2,4,6-tribromophenol acrylate, 2,4,6-tribromophenol methacrylate, 2-(2,4,6-tribromophenoxy)ethyl acrylate), and 2-ethylhexyl acrylate.

Examples of the difunctional monomer may include tri (propylene glycol) diacrylate, trimethylolpropane diallyl ether, and urethane acrylate.

Examples of the multifunctional monomer may include trimethylolpropane triacrylate, dipentaerythritol pentaacrylate, dipentaerythritol hexaacrylate, and ditrimethylolpropane tetraacrylate.

As a macromolecular oligomer, any known oligomer can be used. Examples thereof may include a urethane acrylate oligomer, a polyester acrylate oligomer, a polyester polyurethane acrylate oligomer, and an epoxy acrylate oligomer. An acrylate oligomer having a urethane structure is preferable.

It is preferable that the transcription material contain a hydrophilic material. Examples of a hydrophilic material may include a water-soluble monomer such as acrylamide or a derivative thereof, vinylpyrrolidone, acrylic acid, methacrylic acid, or a derivative thereof, and a polymer made therefrom as a main component. Examples of the monomer may include, but not limited to, N-methylacrylamide, N,N-dimethylacrylamide, acrylamide, acryloylmorpholine, 2-hydroxyethyl acrylate, N,N-dimethylaminoethyl acrylate, vinylpyrrolidone, 2-methacryloyloxyethylphosphorylcholine, 2-methacryloyloxyethyl-D-glycoside, 2-methacryloyloxyethyl-D-mannoside, and vinyl methyl ether. Further, a material having a higher polar functional group typified by an amino group, a carboxyl group, and a hydroxyl group is used to obtain the same effect.

A hydrophilic polymer is not particularly limited. Preferable examples of a main chain structure in the hydrophilic polymer may include an acrylic-based resin, a methacrylic-based resin, a polyvinyl acetal-based resin, a polyurethane-based resin, a polyurea-based resin, a polyimide-based resin, a polyamide-based resin, an epoxy-based resin, a polyester-based resin, a synthetic rubber, and a natural rubber. In particular, an acrylic-based resin and a methacrylic-based resin are preferable since they have an excellent adhesion to a general-purpose resin. Further, an acrylic-based resin is more preferable from the viewpoint of hardenability or the like. The hydrophilic polymer may be a copolymer.

Specific examples of the hydrophilic polymer may include known hydrophilic resins. For example, acrylates or methacrylates having a hydroxyl group, or acrylates or methacrylates having a repeating unit of ethylene glycol in a skeleton are preferable. Specific examples of the hydrophilic polymer may include methoxypolyethylene glycol monomethacrylate, ethoxylated hydroxyethyl methacrylate, polypropylene glycol monomethacrylate, polyethylene glycol diacrylate, polyethylene glycol dimethacrylate, ethoxylated bisphenol A dimethacrylate, and ethoxylated trimethylolpropane triacrylate.

Examples of a hydrophilic additive may include a silane coupling agent typified by vinyltriethoxysilane, vinyltrimethoxysilane, and 3-aminopropyltriethoxysilane, and a surfactant typified by sodium alkyl sulfate and sodium N-acyl-L-glutamate.

Examples of the initiator may include 2,2-dimethoxy-1, 2-diphenylethan-1-one, 1-hydroxy-cyclohexyl phenyl ketone, and 2-hydroxy-2-methyl-1-phenylpropan-1-one.

As the filler, an inorganic fine particle or an organic fine particle can be used. Examples of the inorganic fine particle may include metal oxide fine particles of $SiO_2$, $TiO_2$, $ZrO_2$, $SnO_2$, and $Al_2O_3$.

Examples of the functional additive may include a leveling agent, a surface conditioner, and a defoaming agent.

Examples of the material for the base material 2 may include a methyl methacrylate (co)polymer, polycarbonate, a styrene (co)polymer, a methyl methacrylate-styrene copolymer, cellulose diacetate, cellulose triacetate, cellulose acetate butyrate, polyester, polyamide, polyimide, polyethersulfone, polysulfone, polypropylene, polymethyl pentene, polyvinyl chloride, polyvinyl acetal, polyether ketone, polyurethane, polyethylene terephthalate, polyethylene naphthalate, aramid, polyethylene, polyacrylate, an acrylic resin, an epoxy resin, a urea resin, a urethane resin such as polyurethane, a melamine resin, a cycloolefin polymer, and a cycloolefin copolymer. When the material for the base material 2 is an inorganic material, examples thereof may include quartz, sapphire, glass, and a clay film.

When a polymeric material is used as the material for the base material 2, the thickness of the base material 2 is preferably 3 to 500 μm from the viewpoint of productivity. However, it is not particularly limited to this range.

Examples of the surface adjustor may include a surface lubricant. The surface lubricant may include known lubricants. For example, polydimethyl silicone, a fluorine-based additive, an ester-based lubricant, or an amide-based additive is preferable. When hydrophilicity is imparted, a polyether modified polydimethyl silicone type is preferable.

A method for molding the base material 2 is not particularly limited, and the base material 2 may be an injection molded body, an extrusion molded body, or a cast molded body. If necessary, the surface of the base material may be subjected to a surface treatment such as a corona treatment.

As a method for modifying a surface by post-treatment, for example, a corona treatment, a plasma treatment, or a flame treatment can be used. After the molding, a film can be formed by a hydrophilic inorganic matter such as $SiO_2$ and $TiO_2$ to obtain the same effect.

Figure 14:
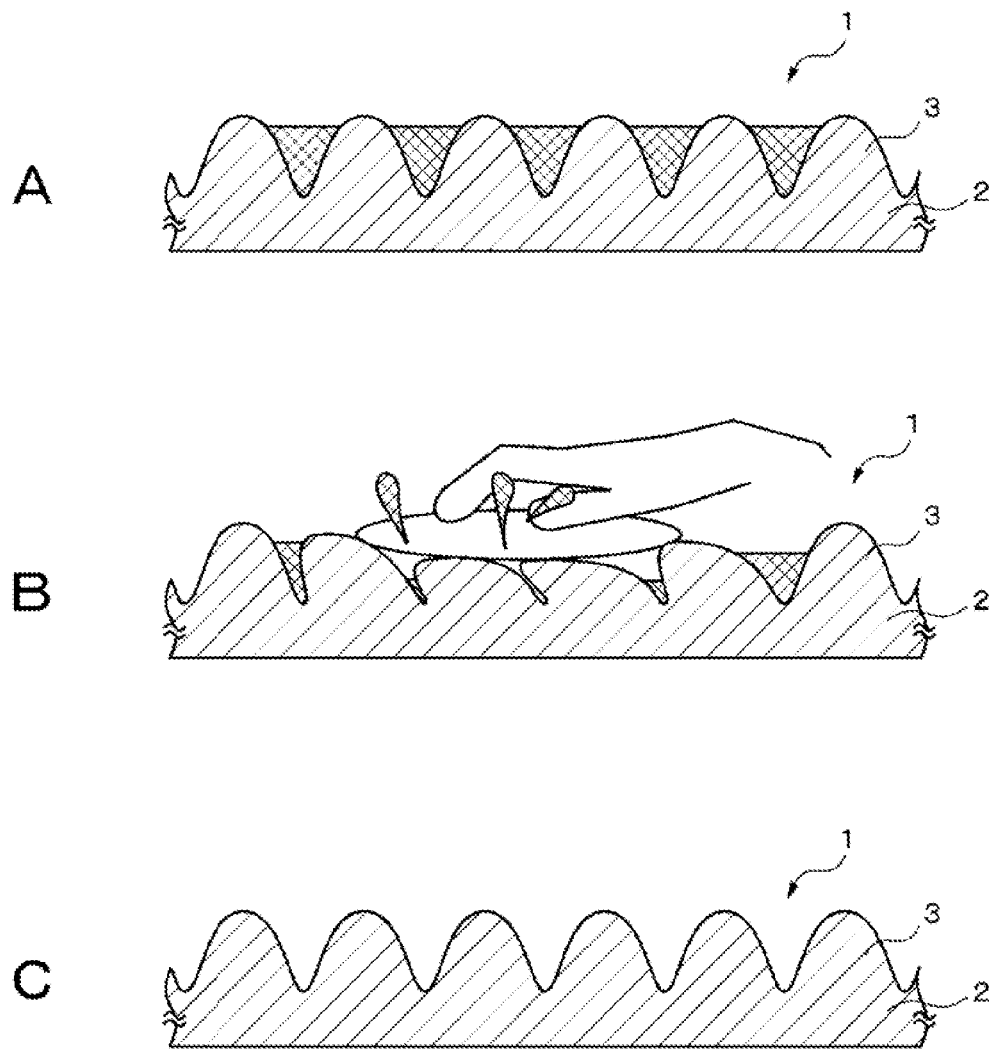
FIG. 14A is a schematic view illustrating removal of a stain attached to the surface of an optical element.
FIG. 14B is a schematic view illustrating removal of a stain attached to the surface of an optical element.
FIG. 14C is a schematic view illustrating removal of the stain attached to the surface of an optical element.

Here, removal of a stain adhered to the surface of the optical element 1 manufactured as described above will be described. FIGS. 14A to 14C are schematic views illustrating the removal of the stain attached to the surface of the optical element 1. As shown in FIG. 14A, when the surface of the optical element 1 is touched, a stain of a fingerprint is attached to spaces between the structures 3. When an external force is applied to the surface of the optical element 1 in such a state, the structures 3 are elastically deformed as shown in FIG. 14B due to the elasticity of the structures 3. As a result, the adjacent elastic bodies 3 are contacted with each other. Thus, the stain attached to the space between the structures 3 is extruded outside, and the stain of a fingerprint can thereby be removed. In the wiping with a damp cloth, water is impregnated easily by this deformation. As a result, the stain can be removed. As shown in FIG. 14C, the shapes of the structures 3 can return to the original shapes after the wiping due to the elasticity.

2. Second Embodiment

Configuration of Optical Element

Figure 15:
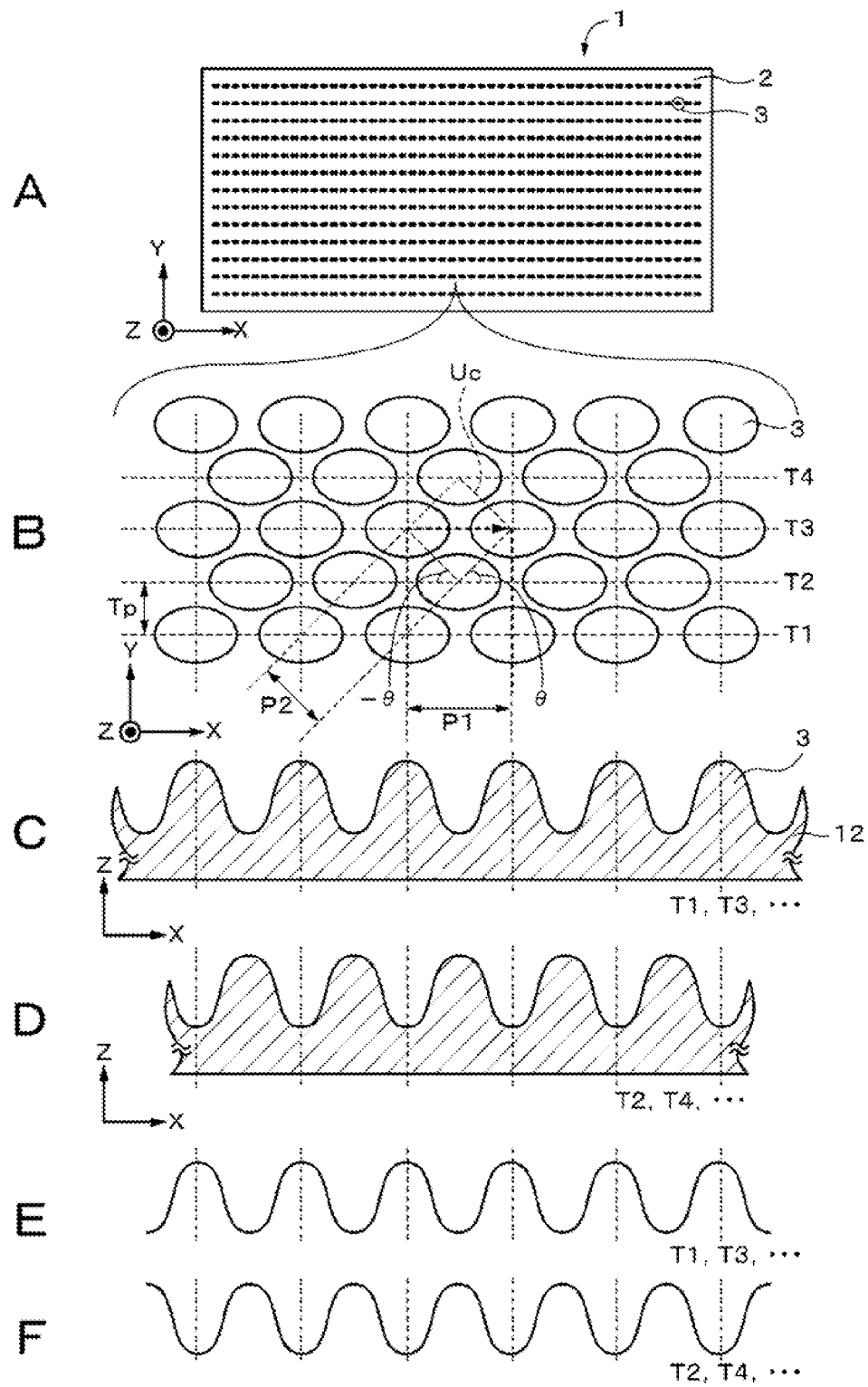
FIG. 15A is a schematic plan view showing one example of the configuration of an optical element according to a second embodiment of the present technology.
FIG. 15B is an enlarged plan view showing part of the optical element shown in FIG. 15A.
FIG. 15C is a cross-sectional view in tracks T1, T3, . . . of FIG. 15B.
FIG. 15D is a cross-sectional view in tracks T2, T4, . . . of FIG. 15B.
FIG. 15E is a schematic diagram showing a modulation waveform of laser beam used in formation of latent image corresponding to the tracks T1, T3, . . . of FIG. 15B.
FIG. 15F is a schematic diagram showing a modulation waveform of laser beam used in formation of latent image corresponding to the tracks T2, T4, . . . of FIG. 15B.

FIG. 15A is a schematic plan view showing one example of the configuration of an optical element according to the second embodiment of the present technology. FIG. 15B is an enlarged plan view showing part of the optical element shown in FIG. 15A. FIG. 15C is a cross-sectional view in tracks T1, T3, . . . of FIG. 15B. FIG. 15D is a cross-sectional view in tracks T2, T4, . . . of FIG. 15B. FIG. 15E is a schematic diagram showing a modulation waveform of laser beam used in formation of latent image corresponding to the tracks T1, T3, . . . of FIG. 15B. FIG. 15F is a schematic diagram showing a modulation waveform of laser beam used in formation of latent image corresponding to the tracks T2, T4, . . . of FIG. 15B.

The optical element 1 according to the second embodiment is different from one according to the first embodiment in that each structure 3 has a tetragonal lattice pattern or a quasi-tetragonal lattice pattern between three adjacent track rows. In the present technology, the quasi-tetragonal lattice pattern herein does not means the regular tetragonal lattice pattern, but means a tetragonal lattice pattern stretched in the track extending direction (X direction) and distorted.

The height or depth of the structures 3 is not particularly limited, and is about 159 nm to 312 nm. The pitch P2 in the (approximately) 45° direction with respect to the tracks is about 275 nm to 297 nm. The aspect ratio (height/arrangement pitch) of the structures 3 is about 0.54 to 1.13. Further, it is not requisite that all the structures 3 have the same aspect ratio, and each structure 3 may have a certain height distribution.

It is preferable that the arrangement pitch P1 of the structures 3 on the same track be longer than the arrangement pitch P2 of the structures 3 between the adjacent two tracks. The ratio P1/P2 of the arrangement pitch P1 of the structures 3 on the same track to the arrangement pitch P2 of the structures 3 between the adjacent two tracks preferably satisfies a relationship of $1.4<P1/P2\leq1.5$. By setting such a numerical range, the packing factor of the structures

3 having an elliptical cone shape or an elliptical frustum shape can be improved. Therefore, the anti-reflection characteristics can be improved. It is preferable that the height or depth of the structures 3 in the 45° direction or approximately 45° direction with respect to the tracks be less than that of the structure 3 in the track extending direction.

It is preferable that the height H2 of the structures 3 in the array direction (θ direction) of the structures 3 at a slant to the track extending direction be lower than the height H1 of the structures 3 in the track extending direction. More specifically, it is preferable that the heights H1 and H2 of the structures 3 satisfy the relationship of H1>H2.

Figure 16:
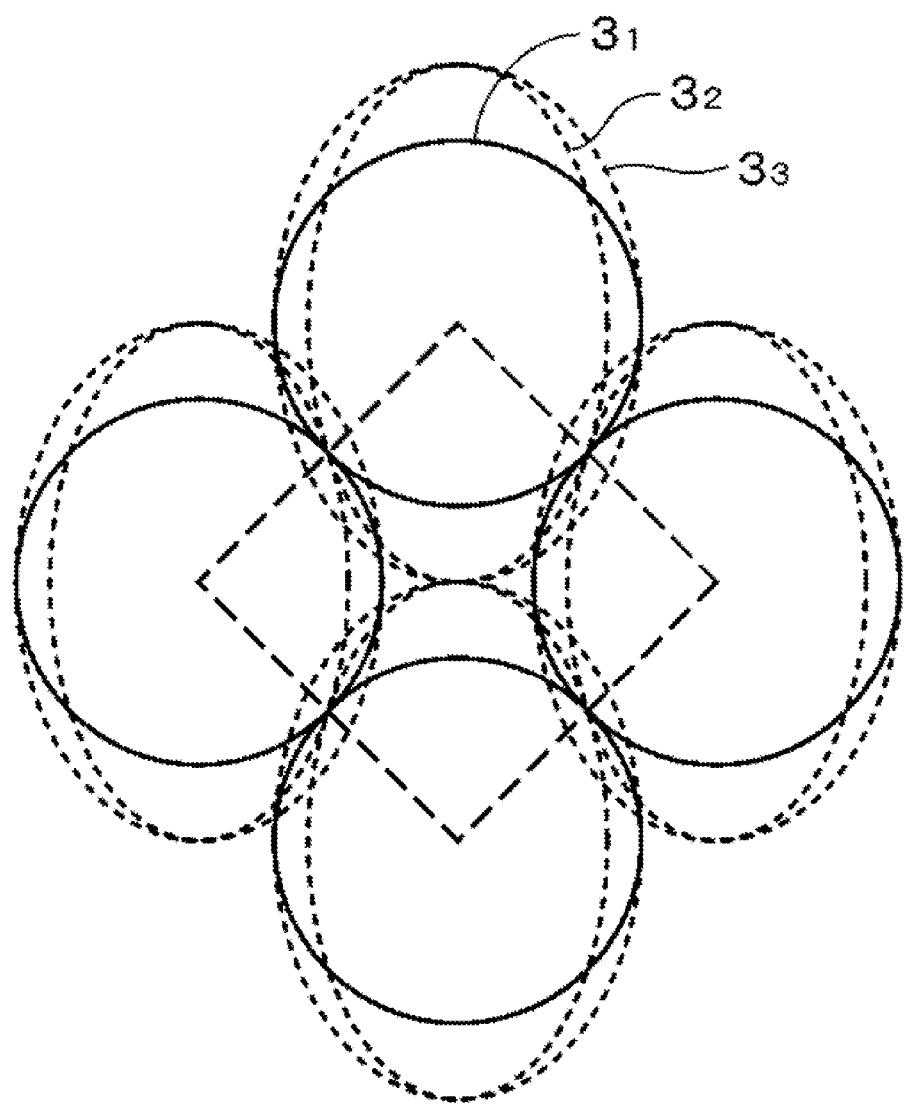
FIG. 16 is a view showing the shape of bottom faces of the structures when the ellipticity of the bottom faces is changed.

FIG. 16 is a view showing the shape of bottom faces of the structures 3 when the ellipticity of the bottom faces is changed. The ellipticities of ellipses $3_1$, $3_2$, and $3_3$ are 100%, 163.3%, and 141%, respectively. When the ellipticity is thus changed, the packing factor of the structures 3 in the surface of the base material can be changed. When a tetragonal lattice pattern or a quasi-tetragonal lattice pattern is formed from the structures 3, the ellipticity e of the bottom faces of the structures preferably satisfies 150%≤e≤180%. This is because such a range can improve the packing factor of the structures 3 and excellent anti-reflective characteristics can be obtained.

The packing factor of the structures 3 in the surface of the base material has an upper limit of 100%, and is within a range of 65% or more, preferably 73% or more, and more preferably 86% or more. A packing factor within such a range can improve the anti-reflection characteristics.

The packing factor (average packing factor) of the structures 3 used herein is a value calculated as follows.

The surface of the optical element 1 is first photographed from the top view with a scanning electron microscope (SEM). Subsequently, a unit lattice Uc is randomly selected from the photographed SEM photographs, and an arrangement pitch P1 and a track pitch Tp of the unit lattice Uc are measured (see FIG. 15B). The area S of the bottom face of any of four structures 3 in the unit lattice Uc is measured by image processing. The packing factor is then calculated using the measured arrangement pitch P1, track pitch Tp, and area S of the bottom face in the following expression (4).

Packing factor=(S(tetra.)/S(unit))×100    (2)

Unit lattice area: S(unit)=2×((P1×Tp)×(1/2))=P1×Tp

Area of bottom face of structure in unit lattice:
S(tetra)=S

In the unit lattices at 10 points selected randomly from the SEM photographs, the calculation of packing factor is performed as described above. The measured values are simply averaged (mathematically) to determine an average packing factor, which is a packing factor of the structures 3 in the surface of the base material.

The ratio ((2r/P1)×100) of diameter 2r to the arrangement pitch P1 is 64% or more, preferably 69% or more, and more preferably 73% or more. This is because such a range can improve the packing factor of the structures 3 and excellent anti-reflective characteristics can be obtained. The arrangement pitch P1 used herein is an arrangement pitch in the track direction of the structures 3. The diameter 2r used herein is a diameter in the track direction of the bottom faces of the structures 3. When the bottom faces of the structures are a circle, 2r is a diameter, and when they are an ellipse, 2r is a major axis.

Figure 17:
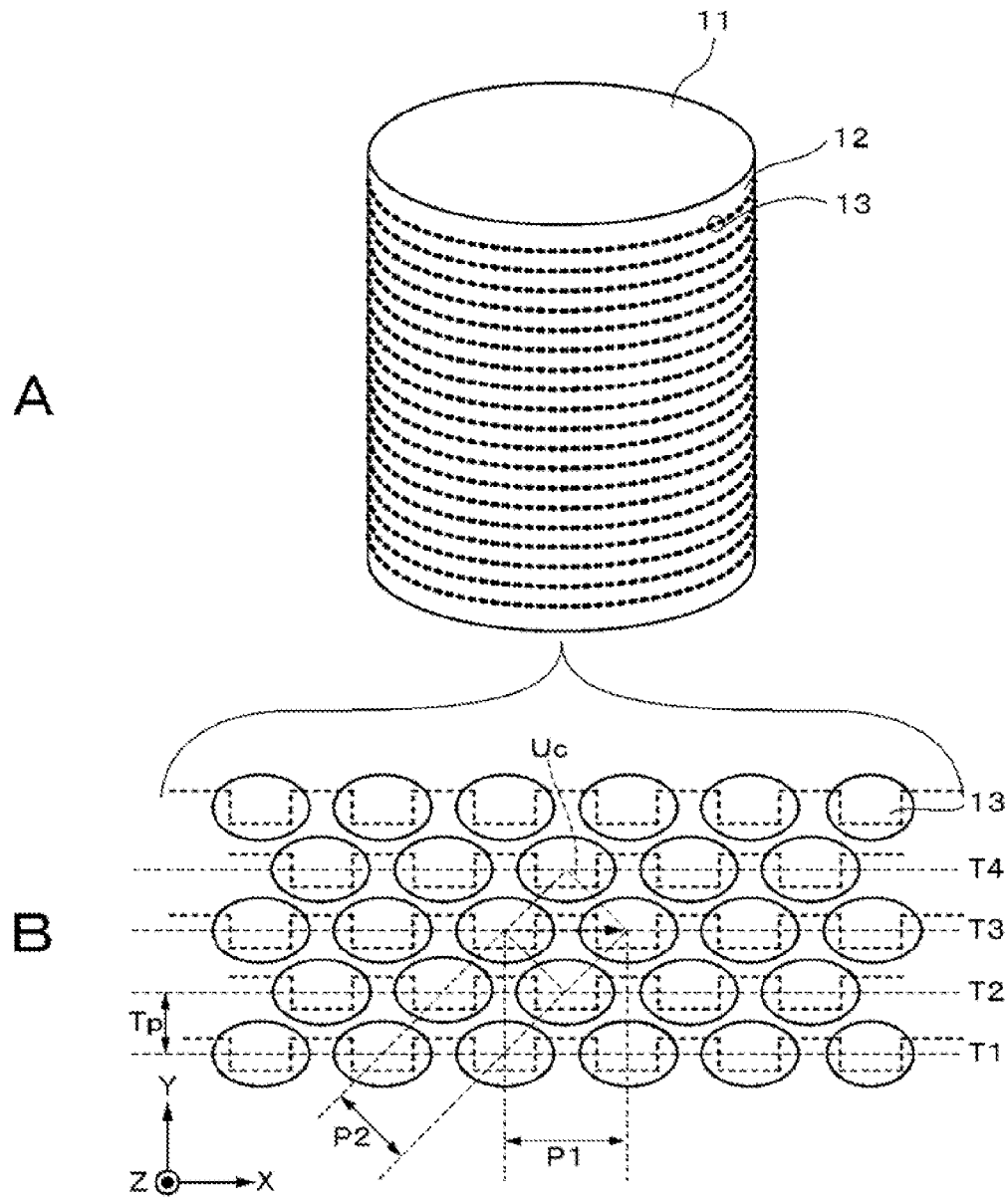
FIG. 17A is a perspective view showing one example of the configuration of the roll master for manufacturing an optical element.
FIG. 17B is a plan view showing one example of the configuration of the roll master for manufacturing an optical element.

FIG. 17 shows one example of the configuration of the roll master for manufacturing an optical element having the configuration described above. The roll master is different from that in the first embodiment in that convex structures 13 are formed on the surface thereof in a tetragonal lattice pattern or a quasi-tetragonal lattice pattern.

[Configuration of Roll Master]

Using a roll master exposure device, two-dimensional patterns are spatially linked, a polarity reverse formatter signal is synchronized with a rotation controller of a recorder, a signal is generated, and a pattern is formed at CAV and an appropriate feeding pitch. Thus, a tetragonal lattice pattern or a quasi-hexagonal lattice pattern can be recorded. It is preferable that the frequency of the polarity reverse formatter signal and the rotation number of the roll be set properly to form a lattice pattern which has a uniform spatial frequency in a desired record region on the resist of the master 12 by laser beam irradiation.

3. Third Embodiment

Configuration of Optical Element

Figure 18:
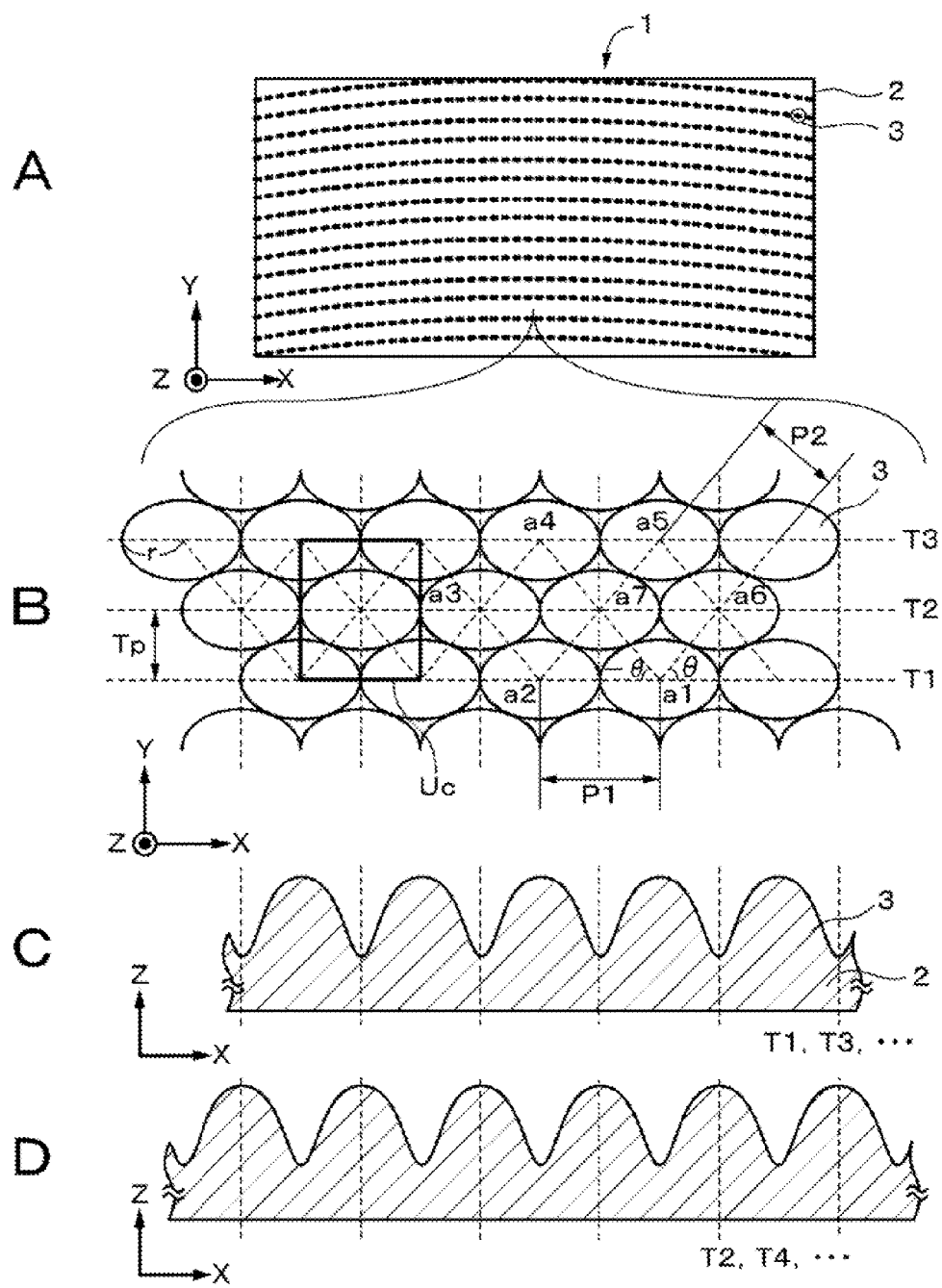
FIG. 18A is a schematic plan view showing one example of the configuration of an optical element according to a third embodiment of the present technology.
FIG. 18B is an enlarged plan view showing part of the optical element shown in FIG. 18A.
FIG. 18C is a cross-sectional view in tracks T1, T3, . . . of FIG. 18B.
FIG. 18D is a cross-sectional view in tracks T2, T4, . . . of FIG. 18B.

FIG. 18A is a schematic plan view showing one example of the configuration of an optical element according to the third embodiment of the present technology. FIG. 18B is an enlarged plan view showing part of the optical element shown in FIG. 18A. FIG. 18C is a cross-sectional view in tracks T1, T3, . . . of FIG. 18B. FIG. 18D is a cross-sectional view in tracks T2, T4, . . . of FIG. 18B.

The optical element 1 according to the third embodiment is different from one according to the first embodiment in that a track T has a circular arc and the structures 3 are arranged in a circular arc shape. As shown in FIG. 18B, in the adjacent three track rows (T1 to T3), the structures 3 are arranged to form a quasi-hexagonal lattice pattern with the centers of the structures 3 positioned at respective points a1 to a7. The quasi-hexagonal lattice pattern used herein does not mean the regular hexagonal lattice pattern, but means a hexagonal lattice pattern distorted along the arc of the tracks T. Alternatively, the quasi-hexagonal lattice pattern does not mean the regular hexagonal lattice pattern, but means a hexagonal lattice pattern distorted along the arc of the tracks T and stretched and distorted in the track extending direction (X axial direction).

The description of the configuration of the optical element 1 except for the above description is omitted since it is the same as that in the first embodiment.

[Configuration of Disk Master]

Figure 19:
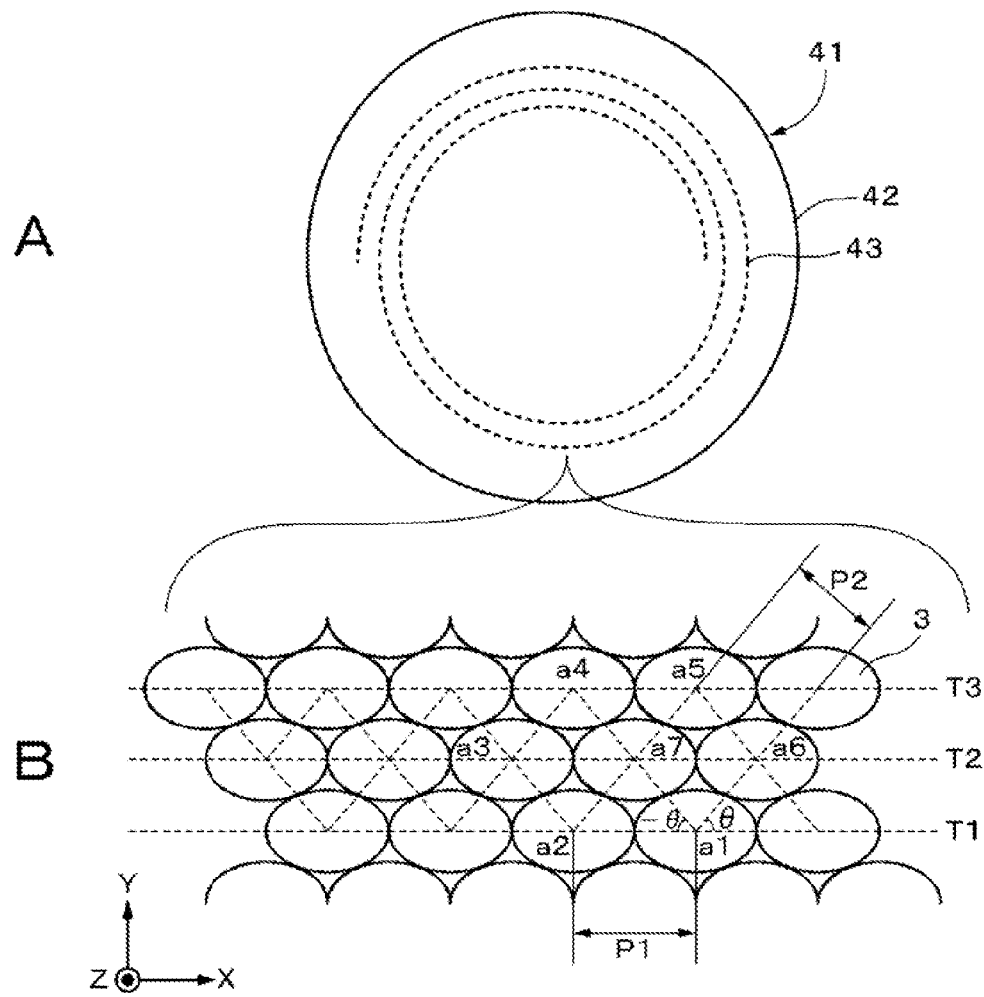
FIG. 19A is a plan view showing one example of the configuration of a disk master for manufacturing an optical element.
FIG. 19B is an enlarged plan view showing part of the disk master shown in FIG. 19A.

FIGS. 19A and 19B show one example of the configuration of a disk master for manufacturing an optical element having the configuration described above. As shown in FIGS. 19A and 19B, a disk master 41 is configured so that a large number of structures 43 which are concave portions are arranged on the surface of a disk-shaped master 42. The structures 43 are two-dimensionally arranged at a pitch equal to or shorter than the wavelength band of light under an environment using the optical element 1, for example, at a pitch equivalent to the wavelength of visible light. The structures 43 are arranged, for example, on a concentric circle or spiral track.

The description of the configuration of the disk master 41 except for the above description is omitted since it is the same as the roll master 11 in the first embodiment.

[Method for Manufacturing Optical Element]

An exposure device for manufacturing a disk master 41 having the above-described configuration will be described with reference to FIG. 20.

A moving optical table 32 includes a beam expander 33, a mirror 38, and an objective lens 34. The laser beam 15 introduced to the moving optical table 32 is shaped into a desired beam form by the beam expander 33, and then is irradiated onto a resist layer on the disk-shaped master 42 through the mirror 38 and objective lens 34. The master 42 is placed on a turntable (not shown) connected to a spindle motor 35. Further, while the master 42 is rotated and the laser beam 15 is moved in the rotational radius direction of the master 42, the resist layer on the master 42 is intermittently irradiated with the laser beam to perform an exposure step of the resist layer. The formed latent image has a substantially elliptical shape having a major axis in the circumferential direction. The laser beam 15 is moved by shifting the moving optical table 32 in the direction indicated by an arrow R.

Figure 20:
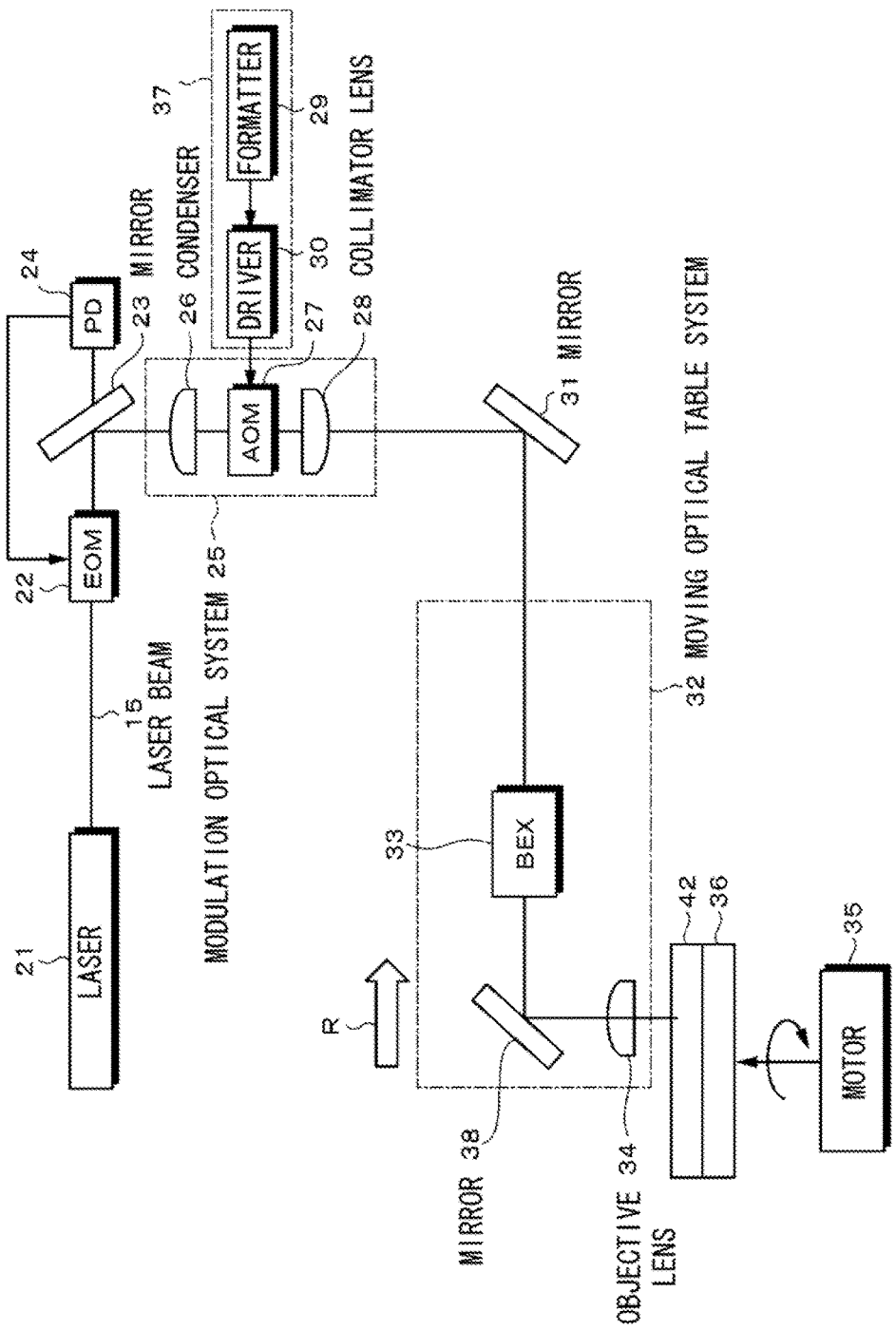
FIG. 20 is a schematic view showing one example of the configuration of a disk master exposure device.

The exposure device shown in FIG. 20 has a control mechanism 37 for forming in the resist layer a latent image of the 2-dimensional pattern of hexagonal lattice or quasi-hexagonal lattice shown in FIG. 18B. The control mechanism 37 has a formatter 29 and a driver 30. The formatter 29 includes a polarity inversion unit, which controls timing of irradiation of the resist layer with the laser beam 15. The driver 30 controls the acoust-optic modulator 27 in response to an output by the polarity inversion unit.

The control mechanism 37 synchronizes the intensity modulation of the laser beam 15 by the AOM 27, the driving rotational speed of the spindle motor 35, and the moving speed of the moving optical table 32 at every track such that the 2-dimensional patterns of the latent images are spatially linked. The master 42 is controlled to be rotated at a constant angular velocity (CAV). Patterning is performed at the appropriate number of revolutions of the master 42 by the spindle motor 35, appropriate frequency modulation of laser intensity by the AOM 27, and appropriate feeding pitch of the laser beam 15 by the moving optical table 32. This enables formation of the latent image of a hexagonal lattice pattern or a quasi-hexagonal lattice pattern on the resist layer.

Further, the control signal of the polarity inversion unit is gradually changed such that the spatial frequency (a pattern density of the latent image: P1: 330, P2: 300 nm; P1: 315 nm, P2: 275 nm; or P1: 300 nm, P2: 265 nm) becomes uniform. Specifically, the exposure is conducted while an irradiation period of the laser beam 15 on the resist layer is changed at every track, and frequency modulation of the laser beam 15 is performed at the control mechanism 37 such that P1 becomes about 330 nm (or 315 nm or 300 nm) on each of the tracks T. In other words, the modulation is controlled such that the irradiation period of laser beam becomes short as the track position becomes distant from the center of the master 42. This enables formation of a nano-pattern in which the spatial frequency is uniform over the entire surface of the substrate.

Hereinafter, one example of the method for manufacturing an optical element according to the third embodiment of the present technology will be described.

A disk master 41 is manufactured in the same manner as in the first embodiment except that the resist layer formed on the disk-shaped master is exposed by the exposure device having the above-described configuration. The disk master 41 is caused to adhere to a base material 2 such as an acrylic sheet coated with an ultraviolet curable resin. The ultraviolet curable resin is cured by ultraviolet irradiation, and the base material 2 is separated from the disk master 41. Thus, a disk-shaped optical element 1 in which a plurality of structures 3 are arranged on the surface is obtained. The disk-shaped optical element 1 is cut into a certain shape such as rectangle. As a result, a targeted optical element 1 is manufactured.

According to the third embodiment, the optical element 1 having high productivity and excellent anti-reflection characteristics can be realized similarly to the structures 3 arranged in a linear fashion.

4. Fourth Embodiment

Figure 21:
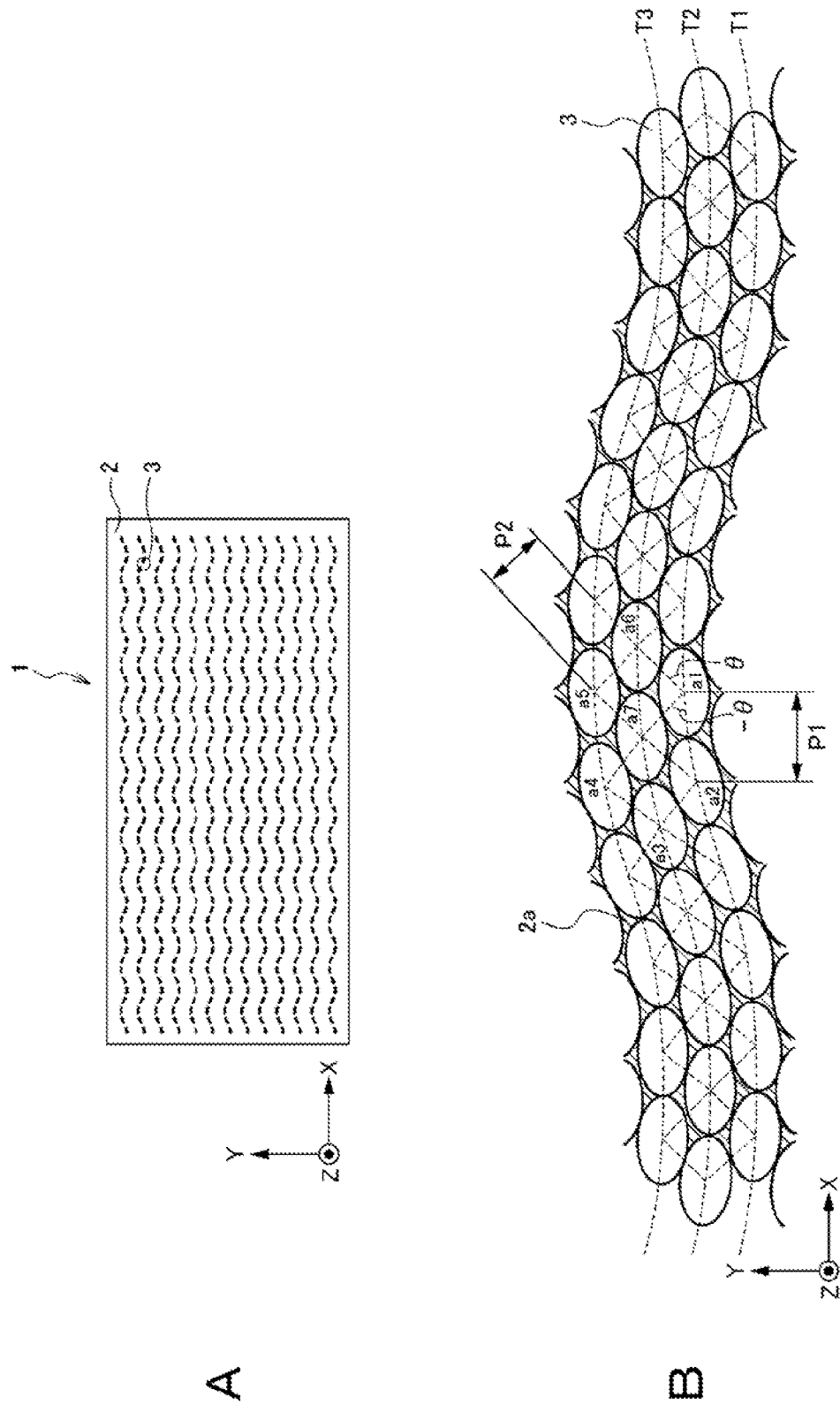
FIG. 21A is a schematic plan view showing one example of the configuration of an optical element according to a forth embodiment of the present technology.
FIG. 21B is an enlarged plan view showing part of the optical element shown in FIG. 21A.

FIG. 21A is a schematic plan view showing one example of the configuration of an optical element according to the fourth embodiment of the present technology. FIG. 21B is an enlarged plan view showing part of the optical element shown in FIG. 21A.

The optical element 1 according to the fourth embodiment is different from one according to the first embodiment in that the structures 3 are arranged in a meandering track (hereinafter referred to as wobble track). A wobbler of each track on the base material 2 is preferably synchronized. In other words, the wobbler is preferably a synchronized wobbler. When the wobbler is thus synchronized, a unit lattice shape of a hexagonal lattice or a quasi-hexagonal lattice can be kept, and the packing factor can be kept high. Examples of waveform of the wobble track may include a sine wave and a triangle wave. The wave shape of the wobble track is not limited to a periodic wave shape, and may be a non-periodic wave shape. The wobble amplitude of the wobble track is set to, for example, about ±10 μm.

In the fourth embodiment, the description other than the above description is the same as that in the first embodiment.

According to the fourth embodiment, the structures 3 are arranged on the wobble track, and the occurrence of irregular on the outside appearance can be suppressed.

5. Fifth Embodiment

Figure 22:
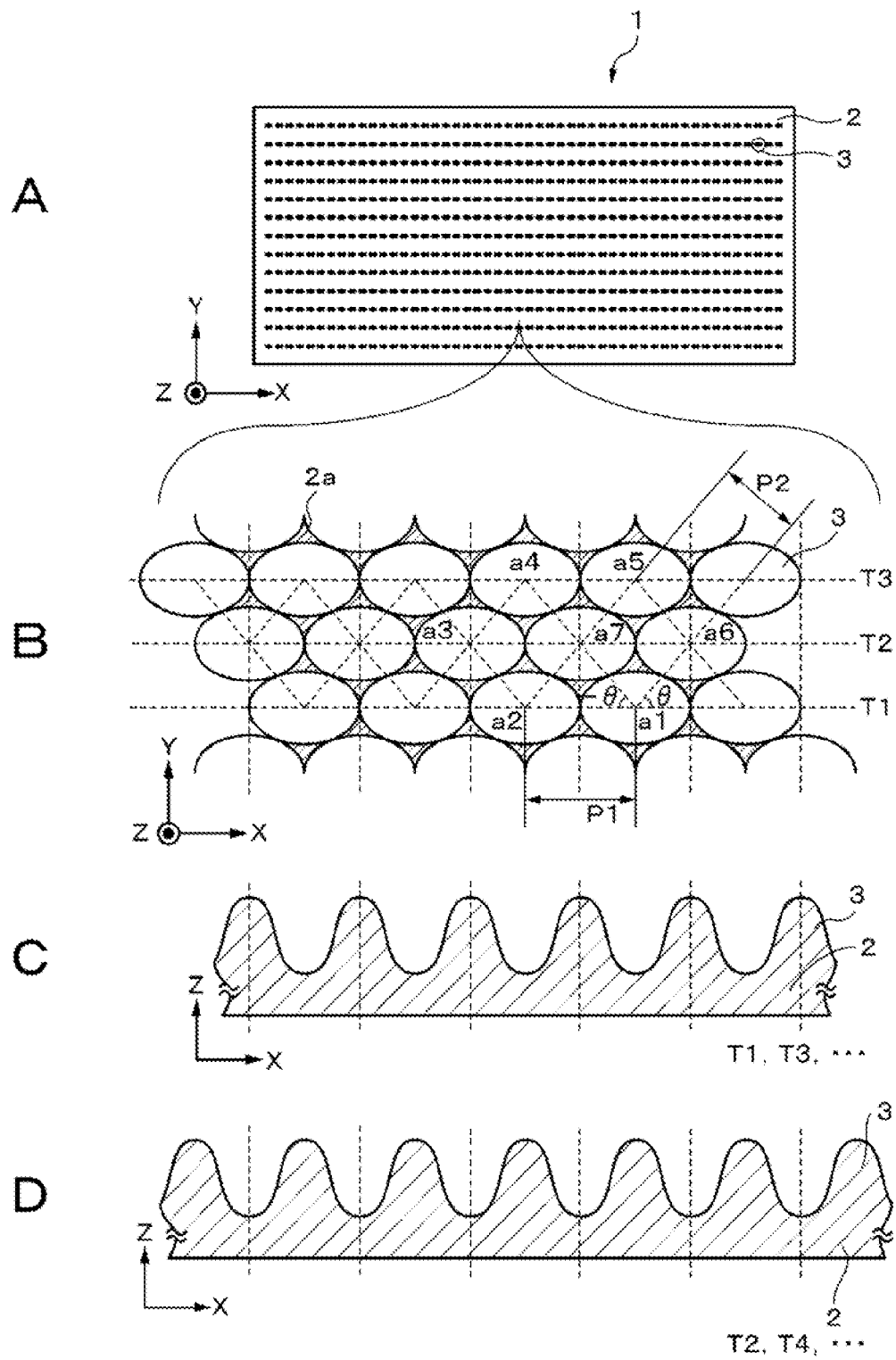
FIG. 22A is a schematic plan view showing one example of the configuration of an optical element according to a fifth embodiment of the present technology.
FIG. 22B is an enlarged plan view showing part of the optical element shown in FIG. 22A.
FIG. 22C is a cross-sectional view in tracks T1, T3, . . . of FIG. 22B.
FIG. 22D is a cross-sectional view in tracks T2, T4, . . . of FIG. 22B.
Figure 23:
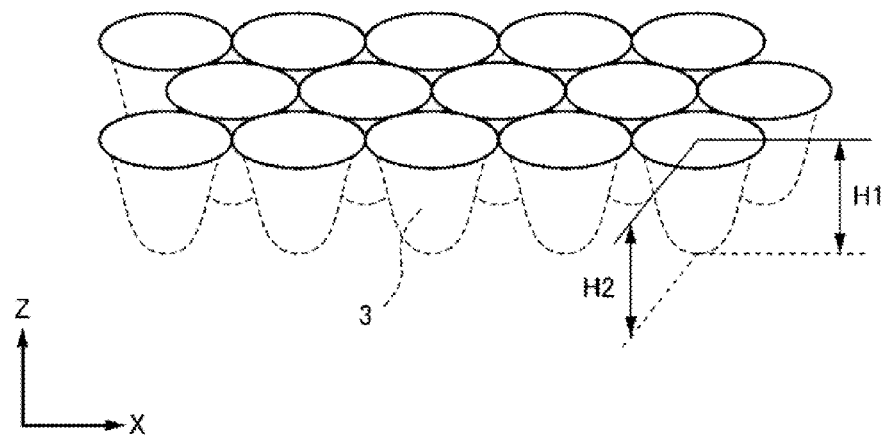
FIG. 23 is an enlarged perspective view which shows part of the optical element shown in FIG. 22A.

FIG. 22A is a schematic plan view showing one example of the configuration of an optical element according to the fifth embodiment of the present technology. FIG. 22B is an enlarged plan view showing part of the optical element shown in FIG. 22A. FIG. 22C is a cross-sectional view in tracks T1, T3, . . . of FIG. 22B. FIG. 22D is a cross-sectional view in tracks T2, T4, . . . of FIG. 22B. FIG. 23 is an enlarged perspective view showing part of the optical element shown in FIG. 22A.

The optical element 1 according to the fifth embodiment is different from one according to the first embodiment in that a large number of structures 3 which are concave portions are arranged on the surface of the base material. The shape of the structures 3 is made into a concave shape by inversion of the convex shape of the structures 3 in the first embodiment. In the structures 3 which are concave portions as described above, the opening portion of each of the structures 3 which are concave portions (inlet portion of the concave portion) is defined as a lower portion, and the lowest portion in the depth direction of the base material 2 (the most deep portion of the concave portion) is defined as a top portion. Therefore, the top portion and lower portion are defined on the basis of the structures 3 which are a non-substantive space. In the fifth embodiment, since the structures 3 are concave portions, the height H of the structures 3 in the expression (1) is defined as the depth H of the structures 3.

In the fifth embodiment, the description other than the above description is the same as that in the first embodiment.

In the fifth embodiment, since the concave shape is made by inversion of the convex structures 3 in the first embodiment, the same effect as in the first embodiment can be obtained.

6. Sixth Embodiment

In the sixth embodiment, at least one kind of hydrophilic compound is contained in the surface of the structures, and therefore the wiping property with a damp cloth is improved.

Examples of the method for containing a hydrophilic compound in the surface of the structures may include a method for adding a hydrophilic compound to a resin material forming the structures and curing the same, and a method for, after the formation of the structures, forming on the surface of the structures a surface treatment layer containing a hydrophilic compound.

Figure 24:
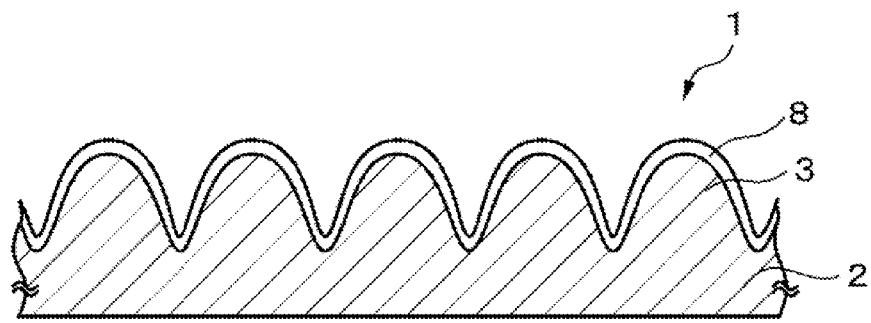
FIG. 24 is a cross-sectional view showing one example of the configuration of an optical element according to a sixth embodiment of the present technology.

FIG. 24 is a cross-sectional view showing one example of the configuration of an optical element according to the sixth embodiment of the present technology. As shown in FIG. 24, the optical element 1 according to the sixth embodiment is different from one according to the first embodiment in that a surface treatment layer 8 is further included in a concavo-convex surface on which the structures 3 are formed.

The water contact angle on the surface on which the surface treatment layer 8 is formed is preferably 110° or less, and more preferably 30° or more. For example, the surface treatment layer 8 contains a hydrophilic compound.
[Hydrophilic Compound]

Examples of a hydrophilic compound may include a monomer a water-soluble monomer such as acrylamide or a derivative thereof, vinylpyrrolidone, acrylic acid, methacrylic acid, or a derivative thereof, and a polymer made therefrom as a main component. Examples thereof may include, but not limited to, N-methylacrylamide, N,N-dimethylacrylamide, acrylamide, acryloylmorpholine, 2-hydroxyethyl acrylate, N,N-dimethylaminoethyl acrylate, vinylpyrrolidone, 2-methacloyloxyethylphosphorylcholine, 2-methacryloyloxyethyl-D-glycoside, 2-methacryloyloxyethyl-D-mannoside, and vinyl methyl ether.

A hydrophilic polymer is not particularly limited. Preferable examples of a main chain structure in the hydrophilic polymer may include an acrylic-based resin, a methacrylic-based resin, a polyvinyl acetal-based resin, a polyurethane-based resin, a polyurea-based resin, a polyimide-based resin, a polyamide-based resin, an epoxy-based resin, a polyester-based resin, a synthetic rubber, and a natural rubber. In particular, an acrylic-based resin and a methacrylic-based resin are preferable since they have an excellent adhesion to a general-purpose resin. Further, an acrylic-based resin is more preferable from the viewpoint of hardenability or the like. The hydrophilic polymer may be a copolymer.
(Method for Forming Surface Treatment Layer)

Examples of the method for forming a surface treatment layer may include a method in which a solution of a compound having hydrophilicity dissolved in a solvent is applied by a gravure coater, a dipping method, a spin-coating method, or spraying, and a method in which a solution of a compound having hydrophilicity dissolved in a solvent is applied by rubbing, followed by drying. Further, examples thereof may include an LB method, a PVD method, a CVD method, a self-organization method, and a sputtering method. Moreover, examples thereof may include a method in which a hydrophilic compound and an ultra-violet curable resin are mixed and the mixture is applied and cured by UV irradiation. A method of surface modification includes a corona treatment, a plasma treatment, and a flame treatment.

7. Seventh Embodiment

Figure 25:
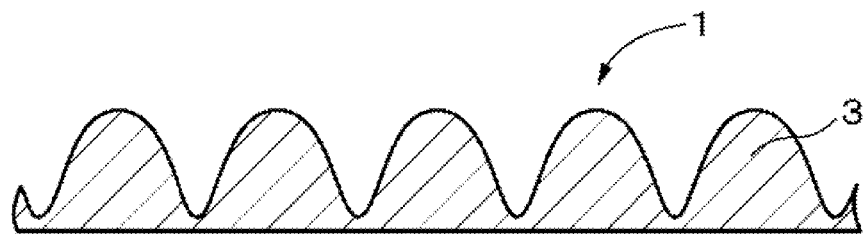
FIG. 25 is a cross-sectional view showing one example of the configuration of an optical element according to a seventh embodiment.

FIG. 25 shows one example of the configuration of an optical element according to the seventh embodiment. As shown in FIG. 25, the optical element 1 is different from one according to the first embodiment in that it does not have a base material 2. The optical element 1 has a large number of structures 3 which comprise convex portions and are arranged at a fine pitch equal to or shorter than the wavelength of visible light, and the lower portions of the adjacent structures are bonded to each other. The plurality of structures which are bonded to each other at the lower portions thereof may have a net shape as a whole.

According to the seventh embodiment, the optical element 1 is attached to a body to be adhered without an adhesive. Further, the optical element 1 may be attached to a three-dimensional curved surface.

8. Eighth Embodiment

Configuration of Liquid Crystal Display Device

Figure 26:
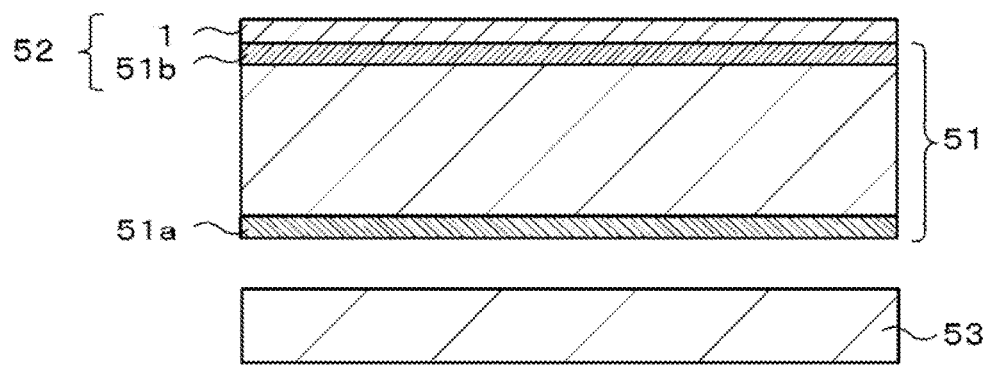
FIG. 26 shows one example of the configuration of a liquid crystal display device according to an eighth embodiment of the present technology.

FIG. 26 shows one example of the configuration of a liquid crystal display device according to the eighth embodiment of the present technology. As shown in FIG. 26, the liquid crystal display device has a backlight 53 emitting light and a liquid crystal panel 51 displaying an image by temporarily and spatially modulating the light emitted from the backlight 53. Polarizers 51*a* and 51*b* which are optical components are provided on respective faces of the liquid crystal panel 51. An optical element 1 is provided on the polarizer 51*b* provided on a display face side of the liquid crystal panel 51. The polarizer 51*b* having the optical element 1 on the main surface is referred to as a polarizer with an anti-reflection function 52. The polarizer with an anti-reflection function 52 is one example of optical components with an anti-reflection function.

Hereinafter, the backlight 53, the liquid crystal panel 51, the polarizers 51*a* and 51*b*, and the optical element 1 which constitute a liquid crystal display device will be described successively.
(Backlight)

As the backlight 53, for example, a direct-lit backlight, an edge-lit backlight, or a planar light source backlight can be used. For example, the backlight 53 has a light source, a reflection plate, and an optical film. As the light source, a cold cathode fluorescent lamp (CCFL), a hot cathode fluorescent lamp (HCFL), an organic electroluminescence (OEL), an inorganic electroluminescence (IEL), a light emitting diode (LED), or the like is used.
(Liquid Crystal Panel)

As the liquid crystal panel 51, for example, a panel of display mode such as a twisted nematic (TM) mode, a super twisted nematic (STM) mode, a vertically aligned (VA) mode, an in-plane switching (IPS) mode, an optically compensated birefringence (OCB) mode, a ferroelectric liquid crystal (FLC) mode, a polymer dispersed liquid crystal (PDLC) mode, or a phase change guest host (PCGH) mode can be used.
(Polarizer)

For example, the polarizers 51*a* and 51*b* are provided on the respective faces of the liquid crystal panel 51 so that the transmission axes thereof are perpendicular to each other. The polarizers 51*a* and 51*b* are to transmit only one polarized component perpendicular to each of the polarizers among incident lights and to block the other light by absorption. As the polarizers 51a and 51b, for example, one in which a dichroic material such an iodine or a dichroic dye is adsorbed into a hydrophilic macromolecular film such as a polyvinyl alcohol-based film, a partially formal polyvinyl alcohol-based film, and an ethylene-vinyl acetate copolymer-based partially saponified film and the film is uniaxially stretched can be used. It is preferable that a protective layer such as a triacetylcellulose (TAC) film be provided on the both faces of the polarizers 51a and 55b. When the protective layer is provided, it is preferable that a base material 2 of an optical element 1 can also serve as the protective layer. In such a configuration, a polarizer with an anti-reflection function 52 can be decreased in thickness.

(Optical Element)

The description of the optical element 1 is omitted since it is the same as that in any of the first to seventh embodiments.

According to the eighth embodiment, the optical element 1 is provided on the display face of a liquid crystal display device, and therefore the anti-reflection function on the display face of the liquid crystal display device can be improved. Accordingly, the legibility of the liquid crystal display device can be improved.

9. Ninth Embodiment

Configuration of Liquid Crystal Display Device

Figure 27:
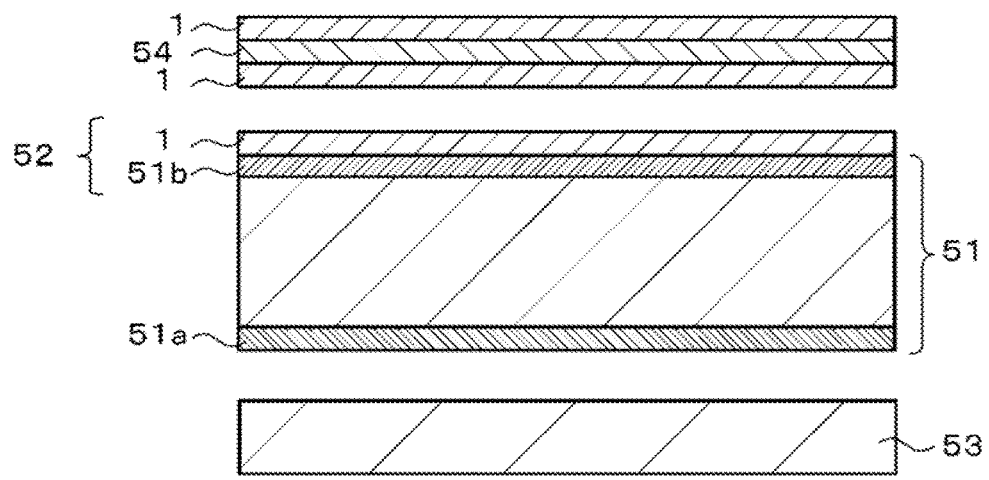
FIG. 27 shows one example of the configuration of a liquid crystal display device according to a ninth embodiment of the present technology.

FIG. 27 shows one example of the configuration of a liquid crystal display device according to the ninth embodiment of the present technology. The liquid crystal display device is different from that according to the fifth embodiment in that a front face member 54 is provided on a front face side of a liquid crystal panel 51 and an optical element 1 is provided on at least one face of a front face of the liquid crystal panel 51 and front and back faces of the front face member 54. FIG. 27 shows one example in which the optical element 1 is provided on all faces of the front face of the liquid crystal panel 51 and the front and back faces of the front face member 54. For example, an air layer is formed between the liquid crystal panel 51 and the front face member 54. The description of the same portions as those in the fifth embodiment is omitted by denoting the same symbols. In the present technology, the front face means a face on a side of display face, that is, a face on a side of an observer, and the back face means a face on an opposite side of the front face.

The front face member 54 is a front panel used in the front face of the liquid crystal panel 51 (observer side) for mechanical, thermal, and weatherproof protection and design characteristics. The front face member 54 has, for example, a sheet shape, a film shape, or a board shape. Examples of the material for the front face member 54 to be used may include glass, triacetylcellulose (TAC), polyester (TPEE), polyethylene terephthalate (PET), polyimide (PI), polyamide (PA), aramid, polyethylene (PE), polyacrylate, polyethersulfone, polysulfone, polypropylene (PP), diacetylcellulose, polyvinyl chloride, an acrylic resin (PMMA), and polycarbonate (PC). These materials are not particularly limited as long as the material has transparency.

According to the ninth embodiment, the legibility of the liquid crystal display device can be improved like the eighth embodiment.

10. Tenth Embodiment

Figure 28:
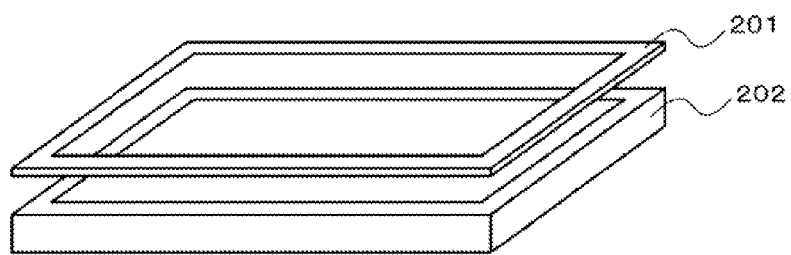
FIG. 28A is an exploded perspective view snowing one example of the configuration of a display device equipped with an information input device according to a tenth embodiment of the present invention.
FIG. 28B is a cross-sectional view showing one example of the configuration of the information input device according to the tenth embodiment of the present technology.
Figure 28:
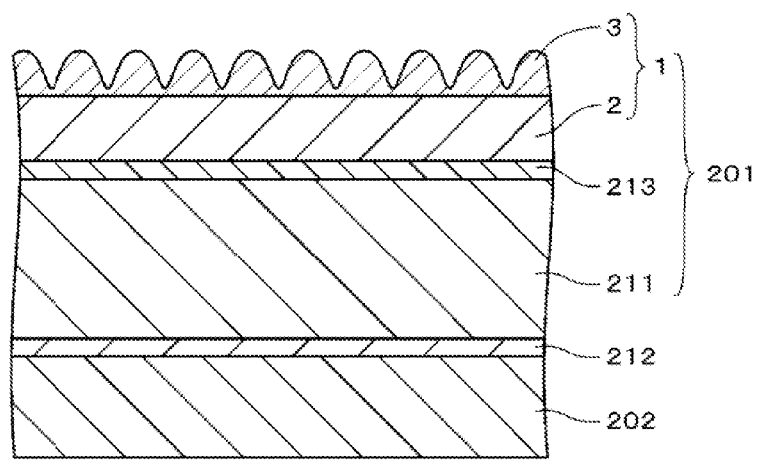

FIG. 28A is an exploded perspective view showing one example of the configuration of a display device equipped with an information input device according to the tenth embodiment of the present technology. FIG. 28B is a cross-sectional view showing one example of the configuration of the information input device according to the tenth embodiment of the present technology. As shown in FIGS. 28A and 28B, an information input device 201 is provided on a display device 202, and the information input device 201 and the display device 202 are bonded, for example, with a bonding layer 212.

The information input device 201 is a so-called touch panel, and has an information input element 211 having an information input face for inputting information by a finger or the like and an optical element 1 provided on the information input face. The information input element 211 and the optical element 1 are bonded, for example, with a bonding layer 213. As the information input element 211, for example, a resistive touch panel, a capacitive touch panel, an optical touch panel, or an ultrasonic touch panel can be used. As the optical element 1, for example, one of the optical elements 1 according to the first to seventh embodiments can be used.

FIG. 28B shows an example in which an optical element 1 having a base material 2 is provided on an information input element 211, but an optical element 1 having no base material 2, that is, a plurality of structures 3 may be provided directly on the information input element 211. In addition, the base material 2 may serve as a base material for an upper electrode of the information input element 211.

As the display device 202, for example, various display devices such as a liquid crystal display, a cathode ray tube (CRT) display, a plasma display panel (PDP), an electroluminescence (EL) display, or a surface-conduction electron-emitter display (SED) can be used.

In the tenth embodiment, the optical element 1 is provided on an information input face of the information input device 201, and therefore the anti-reflection function on the information input face of the information input device 201 can be improved. Accordingly, the legibility of the display device 202 with the information input device 201 can be improved.

11. Eleventh Embodiment

Figure 29:
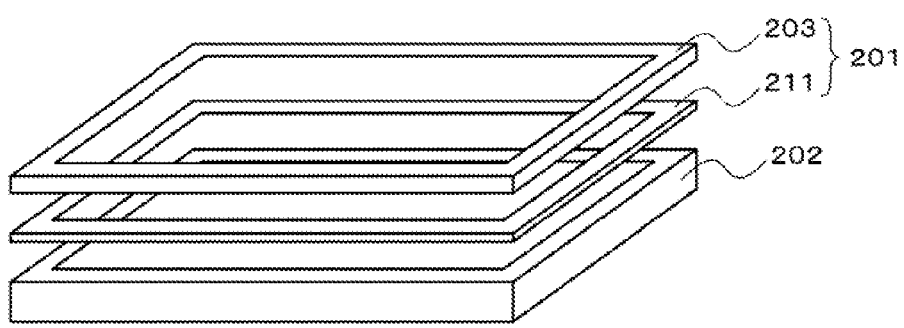
FIG. 29A is an exploded perspective view showing one example of the configuration of a display device equipped with an information input device according to an eleventh embodiment of the present technology.
FIG. 29B is a cross-sectional view showing one example of the configuration of the information input device according to the eleventh embodiment of the present technology.
Figure 29:
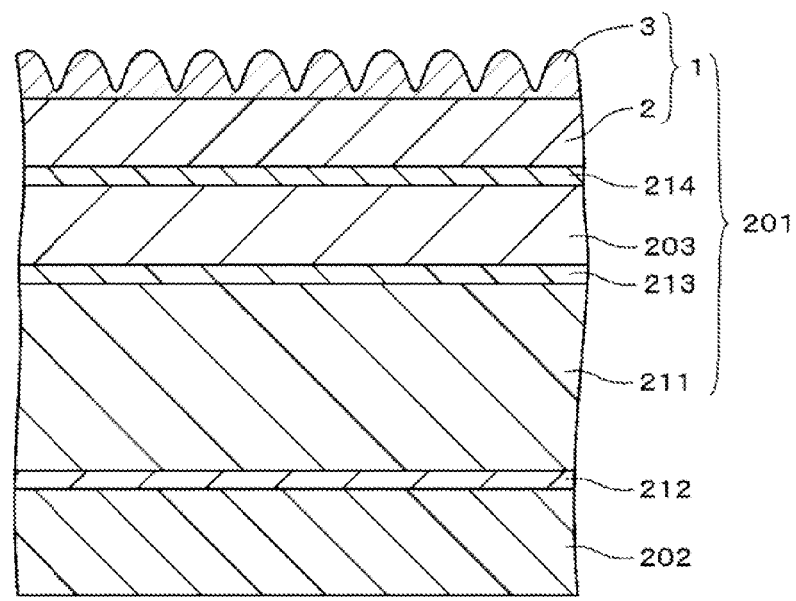

FIG. 29A is an exploded perspective view showing one example of the configuration of a display device equipped with an information input device according to the eleventh embodiment of the present technology. FIG. 29B is a cross-sectional view showing one example of the configuration of the information input device according to the eleventh embodiment of the present technology. As shown in FIGS. 29A and 29B, the information input device 201 is different from one according to the ninth embodiment in that a front face member 203 is further provided on an information input face side of an information input element 211 and an optical element 1 is provided on a front face of the front face member 203. The information input element 211 and the front face member 203 are bonded with a bonding layer 213 and the front face member 203 and the optical element 1 are bonded, for example, with a bonding layer 214.

In the eleventh embodiment, since the optical element 1 is provided on the front face member 203, the same effect as in the tenth embodiment can be obtained.

12. Twelfth Embodiment

Figure 30:
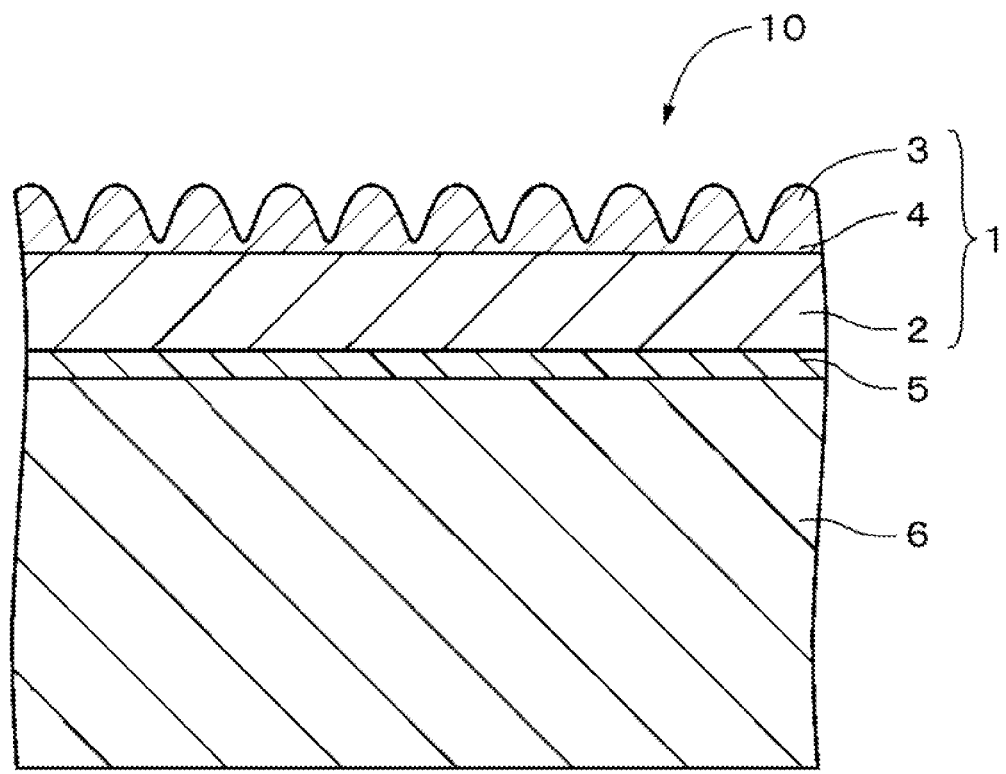
FIG. 30 is a cross-sectional view showing one example of the configuration of a printed matter according to a twelfth embodiment of the present technology.

FIG. 30 is a cross-sectional view showing one example of the configuration of a printed matter according to the twelfth embodiment of the present technology. As shown in FIG. 30, a printed matter 10 has a printed matter body 6 having a surface and an optical element 1 provided on the surface of the printed matter body 6. The printed matter 10 further has a bonding layer 5, with which the printed matter body 6 and the optical element 1 may be bonded. As the material for the bonding layer 5, for example, an acrylic-based, rubber-based, or silicone-based adhesive can be used. From the viewpoint of transparency, an acrylic-based adhesive is preferable. The surface of the printed matter body 6 is, for example, a printed image face in which an image is printed. Of both the main faces of the printed matter 10, a main face on a side having the optical element 1 is referred to as a "front face," and a main face on the opposite side is referred to as a "back face."

Figure 31:
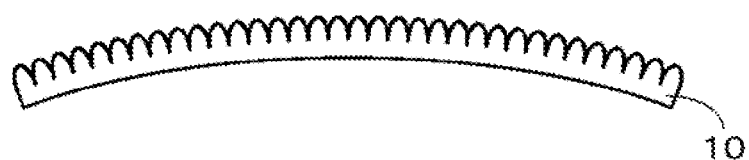
FIG. 31A is a schematic diagram showing a shape example of an optical element.
FIG. 31B is a schematic diagram showing a shape example of the optical element.
FIG. 31C is a schematic diagram showing a shape example of the optical element.
Figure 31:
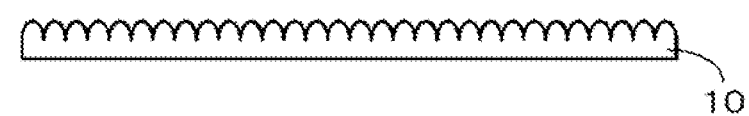
Figure 31:
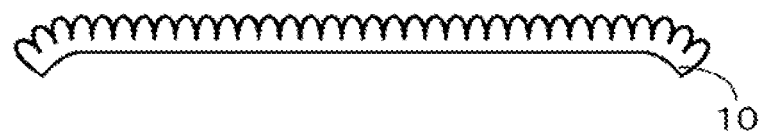

FIGS. 31A to 31C are schematic views showing examples of shape of a printed matter according to the first embodiment of the present technology. As shown in FIG. 31A, the printed matter 10 is preferably curved so that the front face side is protruded. In particular, the curvature preferably has a crest on the central region of the front face. This is because the curvature can produce a beautiful external appearance.

The printed matter 10 preferably has a planar peripheral portion (FIG. 31B) or a curved peripheral portion (FIG. 31C). Here, the curved shape means that the peripheral portion is curved in a direction opposite to the optical element 1 side, as shown in FIG. 3C. Thus, a curvature protruded on the back face side can be suppressed to maintain a beautiful external appearance.

The coefficient of linear expansion of the optical element 1 is preferably larger than that of the printed matter body 6. This is because a curvature protruded on the back face side can be suppressed under an environment of high temperature and/or high humidity to maintain a beautiful external appearance. When the printed matter body 6 has a layered structure including a plurality of layers, the coefficient of linear expansion of the printed matter body 6 represents the coefficient of linear expansion of a layer having the largest coefficient of thermal expansion among the layers constituting the printed matter body 6.

The optical element 1 has a base material 2 having a main face and a plurality of structures 3 arranged on the main face of the base material 2. The structures 3 and the base material 2 are molded separately or integrally. When the structures 3 and the base material 2 are molded separately, a basal layer 4 is further provided between the structures 3 and the base material 2, if necessary. The basal layer 4 is a layer molded integrally with the structure 3 on the bottom face side of the structure 3, and is obtained by curing an energy curable resin composition similar to the structure 3. It is preferable that the optical element 1 be flexible. This is because the optical element 1 can be easily bonded to the printed matter body 6. From the viewpoint of flexibility, the optical element 1 is preferably an optical sheet.

The refractive index difference between the optical element 1 and an adhesive layer 5 is preferably 0.1 or less. This is because Fresnel reflection on an interface can be suppressed and the legibility can be improved. The refractive index differences between the structure 3 and the base material 2 and between the base material 2 and the bonding layer 5 are preferably 0.1 or less. This is because Fresnel reflection on an interface can be suppressed and the legibility can be improved. The surface roughness Rz of the optical element 1 is preferably 1.7 μm or less. This is because a beautiful surface can be obtained.

In the base material 2, a transmission hue in the L*a*b color system on the back face side preferably satisfies the relationship of $L^* \geq 95$, $|b^*| \leq 0.53$, and $|a^*| \leq 0.05$. This is because tinting by the optical element 1 can be suppressed and the legibility of the surface of the printed matter can be improved. In the optical element 1, a transmission hue in the L*a*b color system on the back face side preferably satisfies the relationship of $L^* \geq 96$, $|b^*| \leq 1.9$, and $|a^*| \leq 0.7$. This is because tinting by the optical element 1 can be suppressed and the legibility of the surface of the printed matter can be improved.

In the twelfth embodiment, the descriptions other than the above description are the same as that in the first embodiment.

In the twelfth embodiment, the optical element 1 having a plurality of structures 3 arranged at a fine pitch equal to or shorter than the wavelength of visible light is bonded to the printed matter body 6, and therefore the surface reflection of the printed matter 10 can be suppressed. Accordingly, the contrast of a print image of the printed matter 10 can be improved.

13. Thirteenth Embodiment

The optical element according to the thirteenth embodiment is different from one according to the first embodiment in that the numerical range of a crosslink density of the resin material contained in the structure 3 is specified in addition to or in place of the numerical range of elastic modulus of the resin material forming the structure 3.

The crosslink density of the resin material contained in the structure 3 is 5.1 mol/L or less, and preferably within a range of 0.8 mol/L or more and 5.1 mol/L or less. When the crosslink density is 5.1 mol/L or less, the distance between crosslinks is long and the softness can be imparted to the resin material. Consequently, a stain such as a fingerprint can be discharged and wiped. Further, the reciprocal of crosslink density corresponds to the molecular weight between crosslinks. When the crosslink density is low (that is, the reciprocal of crosslink density is large), the distance between crosslinks is long. On the other hand, when the crosslink density is less than 0.8 mol/L, the excoriation of coating film is significantly low. Therefore, crack by wiping may be caused. Crosslinking includes chemical crosslinking and physical crosslinking. Chemical crosslinking is preferably used.

Further, it is preferable that the surface of the optical element 1 be hydrophilic. This is because the hydrophilic surface is rubbed with a cloth containing moisture once or twice and as a result, a stain can be removed by a discharge effect and replacement due to moisture. The water contact angle on the hydrophilic surface of the optical element 1 is preferably 110° or less, and more preferably 30° or less.

Figure 32:
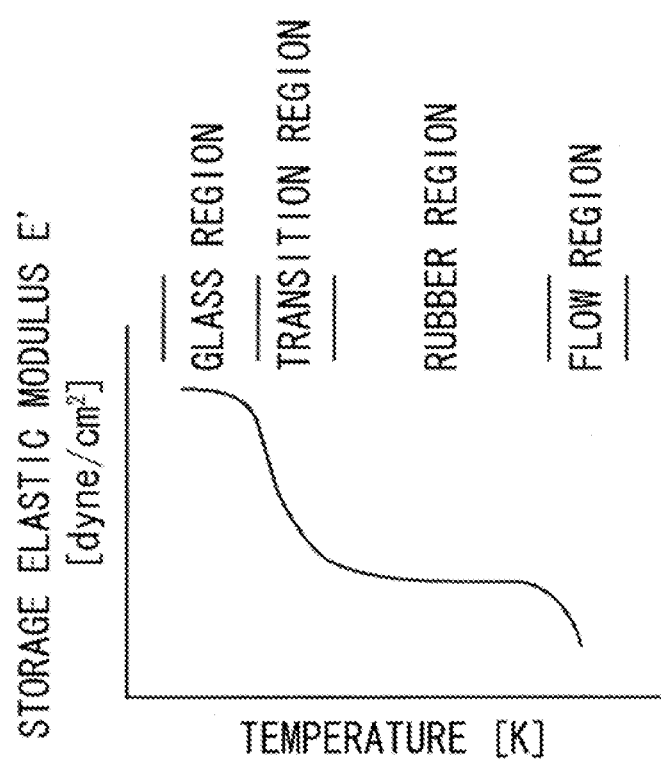
FIG. 32 is a correlation diagram of storage elastic modulus and temperature of a general ultraviolet curable resin.

A method for calculating the crosslink density of a structure 3 will be described with reference to FIG. 32. As shown in FIG. 32, the crosslink density of a resin material has temperature dependency. The crosslink density of a resin material and the state of the resin material correlate to each other, and the crosslink density is divided into four regions of a glassy region, a transition region, a rubber region, and a flow region. The crosslink density of the rubber region of these regions is represented by the following expression.

$$n = E'/3RT$$

(wherein n is a crosslink density (mol/L), E' is a storage elastic modulus (Pa), R is a gas constant (Pa·L/K·mol), and T is an absolute temperature (K).)

Therefore, the crosslink density n can be calculated from the storage elastic modulus E' and the absolute temperature by the above-described expression.

When the crosslink density of the resin material contained in the structure 3 falls within the above-described numerical range, the average molecular weight between crosslinks of the resin material contained in the structure 3 is preferably within a range of 400 or more and 60000 or less, more preferably 500 or more and 10000 or less, and further preferably 700 or more and 1500 or less. When the crosslink density is 5.1 mol/L or less and the average molecular weight between crosslinks is 400 or more, the wiping property can be improved as compared with a case wherein only the numerical range of crosslink density is limited to 5.1 mol/L or less. On the other hand, when the crosslink density is 0.8 mol/L or more and the average molecular weight between crosslinks is 60000 or less, the wiping property can be improved, and crack of coating film can be suppressed. Here, the average molecular weight between crosslinks of the resin material contained in the structures 3 is a value obtained by dividing the average molecular weight of the resin material (for example, oligomer) involved in a polymerization reaction by the average number of functional group when the resin material involved in a polymerization reaction has three or more functional groups. When the resin material involved in a polymerization reaction has two functional groups, the average molecular weight between crosslinks is the average molecular weight of the resin material. However, a resin material having a single functional group is not contained in the resin material involved in a polymerization reaction.

It is preferable that the structures 3 contain a linear macromolecule as a main component. This is because the wiping property can be improved. Examples of the linear macromolecule may include a linear macromolecule in which compounds having two (meth)acryloyl groups are linearly linked one-dimensionally. The compounds are preferably an oligomer having two (meth)acryloyl groups. The (meth)acryloyl group used herein means any one of an acryloyl group and a methacryloyl group.

The structures 3 are obtained by curing an ultraviolet curable resin, for example. A resin component contained in the ultraviolet curable resin preferably contains at least one of an oligomer having two (meth)acryloyl groups and an oligomer having three (meth)acryloyl groups as a main component, and more preferably contains an oligomer having two (meth)acryloyl groups as a main component. When the main component is at least one of an oligomer having two (meth)acryloyl groups and an oligomer having three (meth)acryloyl groups as a main component, the average molecular weight between crosslinks is 400 or more. When the main component is an oligomer having two (meth)acryloyl groups, the average molecular weight between crosslinks can be 400 or more. In addition, an increased viscosity of ultraviolet curable resin as a transcription material can be suppressed, and the transcription property of the ultraviolet curable resin as a transcription material can be improved. The oligomer used herein means a molecule having a molecular weight of 400 or more and 60000 or less.

In order to adjust the elastic modulus of the structures 3, the ultraviolet curable resin may further contain a compound (for example, monomer and/or oligomer) having one (meth)acryloyl group and/or a resin material involved in a polymerization reaction (for example, monomer and/or oligomer).

EXAMPLES

Hereinafter, the present technology will be specifically described by Examples, and the present technology is not limited to these Examples.

(Sample 1)

A glass roll master having an outer diameter of 126 mm was prepared, and the surface of the glass master was coated with a resist as follows. A photoresist was diluted with a thinner to one tenth, and the diluted resist was applied to the columnar surface of the glass roll master by dipping at a thickness of about 130 nm to obtain a resist film. The glass master as a record medium was conveyed to a roll master exposure device shown in FIG. 11. By exposure of the resist to light, a latent image forming a quasi-hexagonal lattice pattern between three adjacent tracks which were linked in one spiral shape was patterned on the resist.

Specifically, a region for formation of a hexagonal lattice pattern was irradiated with a laser beam with a power of 0.50 mW/m so as to expose the surface of the glass roll master, whereby a concave quasi-hexagonal lattice pattern was formed. The resist thickness in the track row direction was about 120 nm, and the resist thickness in the track extending direction was about 100 nm.

The resist on the glass roll master was subjected to a development treatment. As a result, the resist on an exposed area was dissolved and then developed. Specifically, an undeveloped glass roll master was placed on a turntable of a development device not shown. While the glass roll master was rotated with the turntable, a developer was added dropwise to the surface of the glass roll master to develop a resist on the surface. Thus, a resist glass master having an opening in the quasi-hexagonal lattice pattern on the resist layer was obtained.

Next, the resist glass master was plasma-etched in an atmosphere of $CHF_3$ gas using roll plasma etching. As a result, only a region of quasi-hexagonal lattice pattern exposed from the resist layer in the surface of the glass roll master was etched. Another region was not etched since the photoresist acted as a mask. Thus, a concave portion in an elliptical cone shape was obtained. The etching amount (depth) in this pattern was changed according to an etching time. Finally, the photoresist was completely removed by $O_2$ ashing, to obtain a moth eye glass roll master in a concave quasi-hexagonal lattice pattern. The depth of the concave portion in the row direction was more than that of concave portion in the track extending direction.

The moth eye glass roll master was allowed to adhere to a sheet of polymethyl methacrylate resin (PMMA) coated with an ultraviolet curable resin composition having the following composition with a thickness of several μm, and was separated while cured by ultraviolet irradiation. In this manner, an optical element was manufactured.

<Ultraviolet Curable Resin Composition>

| Aliphatic urethane acrylate | 100 parts by mass |
| Photopolymerization initiator | 3% by weight |

Further, the amount of photopolymerization initiator to be added (3% by weight) was relative to 100% by weight of the ultraviolet curable resin composition. The same condition was applied to the following samples 2 to 9.

(Sample 2)

An optical element was manufactured in the same manner as in the sample 1 except that an ultraviolet curable resin composition having the following composition was used.

<Ultraviolet Curable Resin Composition>

| Aliphatic urethane acrylate | 95 parts by mass |
|---|---|
| Water-soluble monomer | 5 parts by mass |
| Photopolymerization initiator | 3% by weight |

(Sample 3)

An optical element was manufactured in the same manner as in the sample 1 except that an ultraviolet curable resin composition having the following composition was used.
<Ultraviolet Curable Resin Composition>

| Aliphatic urethane acrylate | 91 parts by mass |
|---|---|
| Water-soluble monomer | 9 parts by mass |
| Photopolymerization initiator | 3% by weight |

(Sample 4)

An optical element was manufactured in the same manner as in the sample 1 except that an ultraviolet curable resin composition having the following composition was used.
<Ultraviolet Curable Resin Composition>

| Aliphatic urethane acrylate | 87 parts by mass |
|---|---|
| Water-soluble monomer | 13 parts by mass |
| Photopolymerization initiator | 3% by weight |

(Sample 5)

An optical element was manufactured in the same manner as in the sample 1 except that an ultraviolet curable resin composition having the following composition was used.
<Ultraviolet Curable Resin Composition>

| Aliphatic urethane acrylate | 83 parts by mass |
|---|---|
| Water-soluble monomer | 17 parts by mass |
| Photopolymerization initiator | 3% by weight |

(Sample 6)

An optical element was manufactured in the same manner as in the sample 1 except that an ultraviolet curable resin composition having the following composition was used.
<Ultraviolet Curable Resin Composition>

| Aliphatic urethane acrylate | 77 parts by mass |
|---|---|
| Water-soluble monomer | 23 parts by mass |
| Photopolymerization initiator | 3% by weight |

(Sample 7)

An optical element was manufactured in the same manner as in the sample 1 except that an ultraviolet curable resin composition having the following composition was used.
<Ultraviolet Curable Resin Composition>

| Aliphatic urethane acrylate | 71 parts by mass |
|---|---|
| Water-soluble monomer | 29 parts by mass |
| Photopolymerization initiator | 3% by weight |

(Sample 8)

An optical element was manufactured in the same manner as in the sample 1 except that an ultraviolet curable resin composition having the following composition was used.
<Ultraviolet Curable Resin Composition>

| Aliphatic urethane acrylate | 50 parts by mass |
|---|---|
| Water-soluble monomer | 50 parts by mass |
| Photopolymerization initiator | 3% by weight |

(Sample 9)

An optical element was manufactured in the same manner as in the sample 1 except that an ultraviolet curable resin composition having the following composition was used.
<Ultraviolet Curable Resin Composition>

| Water-soluble monomer | 100 parts by mass |
|---|---|
| Photopolymerization initiator | 3% by weight |

(Evaluation of Shape)

The optical elements of the samples 1 to 9 were observed with an atomic force microscope (AFM). The height of the structures of each sample was determined from the cross-sectional profile of AFM.

(Measurement of Contact Angle)

The contact angle of the surface on the moth eye patter formation side of the optical element of each of the samples 1 to 9 was measured with a contact angle meter (manufactured by Kyowa Interface Science Co., Ltd., product name: Type CA-XE). As a liquid used for measurement of contact angle, oleic acid was used.

(Evaluation of Wiping Property)

Wiping with a dry cloth: A fingerprint was attached to a surface on the moth eye pattern formation side of each optical element, and then wiped with a cleaning cloth (manufactured by TORAY INDUSTRIES, INC., trade name: TORAYSEE) at 10 kPa and 10 reciprocations for 5 seconds.

Wiping with a damp cloth: A fingerprint was attached to a surface on the moth eye pattern formation side of each optical element, and then wiped with a cleaning cloth (manufactured by TORAY INDUSTRIES, INC, trade name: TORAYSEE), to which 5 mL of pure water had been added dropwise, at 10 kPa and 5 reciprocations for 5 seconds.

The wiping property was evaluated by comparison of reflectances before attachment of a fingerprint and after wiping with a dry cloth. When the reflectances before attachment of a fingerprint and after wiping with a dry cloth are the same, the optical element is judged to be able to be wiped. The results are shown in Table 1.

In Table 1, a sample in which wiping is possible is represented by "A" (one in which wiping is particularly easy is represented by "AA"), one in which the fingerprint partly remains but can be removed is represented by "B," and one in which wiping with a dry cloth is impossible is represented by "C." As the reflectance, the reflectance of visible light at a wavelength of 532 nm was measured with an evaluation device (manufactured by JASCO Corporation, trade name: V-550).

(Measurement of Elastic Modulus)
(Measurement by Tension Test Machine)

A planar film was produced from the same material as the ultraviolet curable resin composition used for the production of an optical element (UV curing), and cut into a shape of 14 mm in width, 50 mm in length, and about 200 μm in thickness. The film was used as a film sample. The elastic modulus of the film sample was measured with a tension test machine (manufactured by Shimadzu Corporation, product name: AG-X) in accordance with JIS K7127.

The elastic modulus of each optical element with a moth eye pattern formed thereon was measured with a test machine for surface coating film physical properties (manufactured by Fischer Instruments K.K., trade name: Fischerscope HM-500). As a result, the elastic modulus measured with a microhardness tester and the specific elastic modulus of material measured with a tension test machine are substantially the same.

TABLE 1

| | Amount of aliphatic urethane acrylate to be added [parts by mass] | Amount of water-soluble monomer to be added [parts by mass] | Contact angle [°] | Wiping with dry cloth | wiping with damp cloth |
|---|---|---|---|---|---|
| Sample 1 | 100 | 0 | 111.1 | | C |
| Sample 2 | 95 | 5 | 109.0 | A | B |
| Sample 3 | 91 | 9 | 107.0 | A | A |
| Sample 4 | 87 | 13 | 61.5 | A | A |
| Sample 5 | 83 | 17 | 50.7 | A | A |
| Sample 6 | 77 | 23 | 23.4 | B | AA |
| Sample 7 | 71 | 29 | 15.7 | B | AA |
| Sample 8 | 50 | 50 | 10.3 | C | AA |
| Sample 9 | 0 | 100 | 4.0 | C | AA |

From the results of the evaluations, it is found as follows.

In the evaluation of wiping property, wiping with a dry cloth in the samples 8 and 9 is impossible. This is because the elastic moduli of the optical elements are outside the range of 5 MPa to 1200 MPa. Further, wiping with a damp cloth in the sample 1 is impossible. This is because the contact angle of the optical element is more than 110°.

(Sample 10)

An optical element was manufactured in the same manner as in the sample 1 except that an ultraviolet curable resin composition having the following composition was used and a material for the ultraviolet curable resin composition was used in an experiment after weighing the material, placing it in an oven at 60° C. to improve the flowability thereof, mixing it for 1 minute with a stirrer (manufactured by THINKY), and returning it in normal temperature.

<Ultraviolet Curable Resin Composition>

| | |
|---|---|
| Urethane acrylate (High resilience resin: average molecular weight: 1000, number of functional group: 2) | 95 parts by mass |
| Photopolymerization initiator | 5 parts by mass |
| Silicone additive (Polyether modified polydimethyl silicone) | 0.5% by weight |

Further, the above-described amount of additive to be added was relative to 100% by weight of the ultraviolet curable resin composition.

(Sample 11)

An optical element was manufactured in the same manner as in the sample 10 except that an ultraviolet curable resin composition having the following composition was used.

<Ultraviolet Curable Resin Composition>

| | |
|---|---|
| Urethane acrylate (High resilience resin: average molecular weight: 1000, number of functional group: 2) | 80 parts by mass |
| Hydrophilic acrylate monomer | 15 parts by mass |
| Photopolymerization initiator (α-Hydroxyalkylphenone) | 5 parts by mass |
| Silicone additive (Polyether modified polydimethyl silicone) | 0.5% by weight |

(Sample 12)

An optical element was manufactured in the same manner as in the sample 10 except that an ultraviolet curable resin composition having the following composition was used.

<Ultraviolet Curable Resin Composition>

| | |
|---|---|
| Urethane acrylate (High resilience resin: average molecular weight: 1000, number of functional group: 2) | 70 parts by mass |
| Hydrophilic acrylate monomer | 25 parts by mass |
| Photopolymerization initiator (α-Hydroxyalkylphenone) | 5 parts by mass |
| Silicone additive (Polyether modified polydimethyl silicone) | 0.5% by weight |

(Sample 13)

An optical element was manufactured in the same manner as in the sample 10 except that an ultraviolet curable resin composition having the following composition was used.

<Ultraviolet Curable Resin Composition>

| | |
|---|---|
| Urethane acrylate (High resilience resin: average molecular weight: 1000, number of functional group: 2) | 60 parts by mass |
| Hydrophilic acrylate monomer | 35 parts by mass |
| Photopolymerization initiator (α-Hydroxyalkylphenone) | 5 parts by mass |
| Silicone additive (Polyether modified polydimethyl silicone) | 0.5% by weight |

(Sample 14)

An optical element was manufactured in the same manner as in the sample 10 except that an ultraviolet curable resin composition having the following composition was used.

<Ultraviolet Curable Resin Composition>

| | |
|---|---|
| Urethane acrylate (High resilience resin: average molecular weight: 1000, number of functional group: 2) | 50 parts by mass |
| Hydrophilic acrylate monomer | 45 parts by mass |
| Photopolymerization initiator (α-Hydroxyalkylphenone) | 5 parts by mass |
| Silicone additive (Polyether modified polydimethyl silicone) | 0.5% by weight |

(Sample 15)

An optical element was manufactured in the same manner as in the sample 10 except that an ultraviolet curable resin composition having the following composition was used.

<Ultraviolet Curable Resin Composition>

| | |
|---|---|
| Urethane acrylate (High resilience resin: average molecular weight: 1500, number of functional group: 2) | 95 parts by mass |
| Photopolymerization initiator | 5 parts by mass |
| Silicone additive (Polyether modified polydimethyl silicone) | 0.5% by weight |

(Sample 16)

An optical element was manufactured in the same manner as in the sample 10 except that an ultraviolet curable resin composition having the following composition was used.
<Ultraviolet Curable Resin Composition>

| | |
|---|---|
| Urethane acrylate (High resilience resin: average molecular weight: 1000, number of functional group: 2) | 95 parts by mass |
| Photopolymerization initiator | 5 parts by mass |
| Silicone additive (Polyether modified polydimethyl silicone) | 0.5% by weight |

(Sample 17)

An optical element was manufactured in the same manner as in the sample 10 except that an ultraviolet curable resin composition having the following composition was used.
<Ultraviolet Curable Resin Composition>

| | |
|---|---|
| Urethane acrylate (High resilience resin: average molecular weight: 2100, number of functional group: 3) | 95 parts by mass |
| Photopolymerization initiator | 5 parts by mass |
| Silicone additive (Polyether modified polydimethyl silicone) | 0.5% by weight |

(Sample 18)

An optical element was manufactured in the same manner as in the sample 10 except that an ultraviolet curable resin composition having the following composition was used.
<Ultraviolet Curable Resin Composition>

| | |
|---|---|
| Difunctional acrylate (Molecular weight: 332, number of functional group: 2) | 95 parts by mass |
| Photopolymerization initiator | 5 parts by mass |
| Silicone additive (Polyether modified polydimethyl silicone) | 0.5% by weight |

(Sample 19)

An optical element was manufactured in the same manner as in the sample 10 except that an ultraviolet curable resin composition having the following composition was used.
<Ultraviolet Curable Resin Composition>

| | |
|---|---|
| Difunctional acrylate (Molecular weight: 349, number of functional group: 2) | 95 parts by mass |
| Photopolymerization initiator | 5 parts by mass |
| Silicone additive (Polyether modified polydimethyl silicone) | 0.5% by weight |

(Sample 20)

An optical element was manufactured in the same manner as in the sample 10 except that an ultraviolet curable resin composition having the following composition was used.
<Ultraviolet Curable Resin Composition>

| | |
|---|---|
| Trifunctional acrylate (Molecular weight: 956, number of functional group: 3) | 95 parts by mass |
| Photopolymerization initiator | 5 parts by mass |
| Silicone additive (Polyether modified polydimethyl silicone) | 0.5% by weight |

(Sample 21)

An optical element was manufactured in the same manner as in the sample 10 except that an ultraviolet curable resin composition having the following composition was used.
<Ultraviolet Curable Resin Composition>

| | |
|---|---|
| Tetrafunctional acrylate (Molecular weight: 352, number of functional group: 4) | 95 parts by mass |
| Photopolymerization initiator | 5 parts by mass |
| Silicone additive (Polyether modified polydimethyl silicone) | 0.5% by weight |

(Calculation of Crosslink Density)

The crosslink density was calculated by the following expression. Further, the storage elastic modulus E' was measured with a dynamic viscoelasticity meter (manufactured by Rheometric Scientific F E Ltd.) at normal temperature, and the absolute temperature was used as the normal temperature.

$$n = E'/3RT$$

(wherein n is a crosslink density (mol/L), E' is a storage elastic modulus (Pa), R is a gas constant (Pa·L/K·mol), and T is an absolute temperature (K).)

(Measurement of Contact Angle and Elastic Modulus)

Methods for measuring a contact angle and an elastic modulus were the same methods as those for the samples 1 to 9.

(Evaluation of Wiping Property)

Methods of wiping with a dry cloth and with a damp cloth were the same methods as those for the samples 1 to 9. In the samples 10 to 21, a wiping operation was repeated until the possibility or impossibility of wiping a fingerprint was determined. The results are shown in Table 2.

In the evaluation of wiping property of Table 2, a sample in which a fingerprint can be easily wiped a few times is represented by "AA," one in which a fingerprint can be wiped about 10 times is represented by "A," one in which a fingerprint can be wiped a few tens times is represented by "B," and one in which wiping is impossible is represented by "C."

TABLE 2

| | Elastic modulus [MPa] | Crosslink density [mol/L] | Average molecular weight | Contact angle [°] | Wiping with dry cloth | Wiping with damp cloth |
|---|---|---|---|---|---|---|
| Sample 10 | 69.96 | 4.484 | 1000 | 34 | AA | B |
| Sample 11 | 140.1 | 2.124 | 1000 | 21 | AA | AA |
| Sample 12 | 21.20 | 2.629 | 1000 | 10 | AA | AA |
| Sample 13 | 12.88 | 1.376 | 1000 | 5.5 | AA | AA |
| Sample 14 | 7.330 | 0.897 | 1000 | 4 | AA | AA |
| Sample 15 | 383.2 | 1.325 | 1500 | 25 | AA | AA |
| Sample 16 | 264.2 | 2.848 | 1000 | 50 | AA | B |
| Sample 17 | 132.5 | 5.012 | 700 | 35 | AA | B |
| Sample 18 | 2263 | 12.94 | 332 | 14 | B | B |
| Sample 19 | 652.6 | 5.017 | 349 | 32 | A | B |
| Sample 20 | 36.45 | 4.165 | 319 | 13 | B | B |
| Sample 21 | 1469 | 23.93 | 176 | 60 | C | C |

Figure 33:
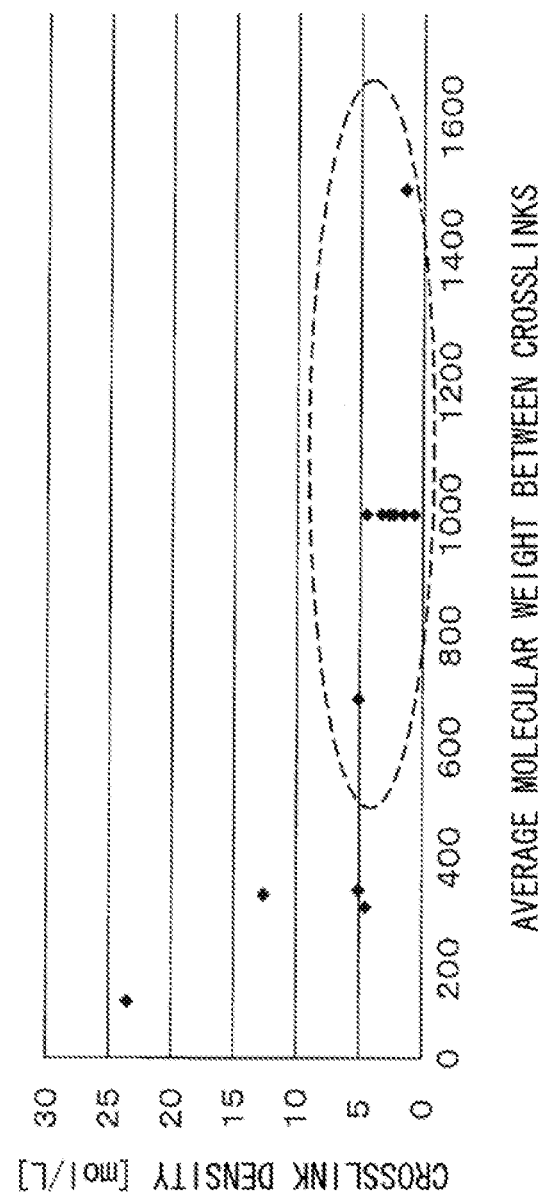
FIG. 33 is a graph in which the crosslink density and average molecular weight between crosslinks of samples 10 to 21 in Examples are plotted.

FIG. 33 shows a graph in which the crosslink density and average molecular weight between crosslinks of the samples 10 to 21 are plotted.

From the results of the evaluations, it is found as follows.

In the evaluation of wiping property of the samples 10 to 17 surrounded by a dotted ellipse in FIG. 33, a fingerprint was removed very easily by wiping with a dry cloth. This is because the structures of each optical element contain an oligomer as a main component, the average molecular weight between crosslinks is specifically 500 or more and 1700 or less, and the crosslink density is 0.8 mol/L or more and 5.1 mol/L or less. Particularly, in the samples 11 to 15, a fingerprint was removed very easily by wiping with a damp cloth. This is because the contact angles of the optical elements are 30° or less and the structures are hydrophilic.

The use of difunctional oligomer as the material for the structures facilitates viscosity adjustment as compared with the use of trifunctional oligomer, and therefore it was found that a transcription operation was simple.

Examples of the present technology have been described above with respect to an anti-reflective substrate, but can be variously modified on the basis of technical concept of the present technology.

The embodiments and Examples of the present technology have been specifically described above, but the present technology is not limited to the embodiments and Examples, and can be modified on the basis of the technical concept of the present technology.

For example, the configurations, methods, shapes, materials, and numerical values cited in the above-described embodiments and Examples are merely examples and different configurations, methods, shapes, materials, and numerical values may be used if necessary.

The respective configurations of the above-described embodiments may be combined with each other without departing from the gist of the present technology.

In the above-described embodiments, the present technology is described with reference to application to a liquid crystal display device as Examples. However, the present technology can be applied to various display devices other than the liquid crystal display device. The present technology can be applied to, for example, various display devices such as a cathode ray tube (CRT) display, a plasma display panel (PDP), an electroluminescence (EL) display, and a surface-conduction electron-emitter display (SED).

In the above-described embodiments, the pitch of the structures can be appropriately changed to generate diffraction light in a direction oblique to the front. Thus, a function of preventing peek may be imparted to an optical element.

In the above-described embodiments, a low refractive index layer may be further formed on the surface of a base material having structures formed thereon. It is preferable that the low refractive index layer contain a material having a refractive index lower than a material forming a base material and a structure as a main component. Examples of the material for such a low refractive index layer may include an organic material such as a fluoride-based resin and an inorganic low refractive index material such as LiF and $MgF_2$.

In the above-described embodiments, the present technology has been described with reference to production of an optical element from a photosensitive resin. However, the method for manufacturing an optical element is not limited to this example. For example, an optical element may be manufactured by thermal transfer or injection molding In the above-described embodiments, the case wherein concave or convex structures are formed on the outer circumference surface of a columnar or cylindrical master has been described as an example. However, when a master is cylindrical, concave or convex structures may be formed on the inner circumference surface of the master.

In the above-described embodiments, the elastic modulus of the material forming the structures may be 1 MPa or more and 200 MPa or less and the aspect ratio of the structures may be 0.2 or more and 0.6 or less. In this case, a stain such as a fingerprint attached to the surface of an optical element can be removed by wiping.

In the above-described embodiments, an example of application of an optical element to the surface of a printed matter has been described. However, the present technology is not limited to this example, and may be applied to the surface of a print image or the like.

REFERENCE SIGNS LIST 1 optical element
2 base material
3 structure
5 bonding layer
6 printed matter body
11 roll master
12 base material
13 structure
14 resist layer
15 laser beam
16 latent image
21 laser
22 electro optical modulator
23, 31 mirror
24 photodiode
26 condenser
27 acoust-optic modulator
28 collimator lens
29 formatter
30 driver
32 moving optical table system
33 beam expander
34 objective lens
35 spindle motor
36 turntable
37 control mechanism

The invention claimed is:

1. An optical element comprising:
a base material having a surface; and
a plurality of structures which are fixed on the surface of the base material at a pitch of 175 nm or more and 350 nm or less and which each comprise a convex or concave portion, wherein
a water contact angle on the surface on which the structures are formed is 110° or less,
a crosslink density of the structures is 0.8 mol/L or more and 5.1 mol/L or less,
an elastic modulus of a material forming the structures is 1 MPa or more and 1200 MPa or less, and
the surface on which the structures are formed is hydrophilic.

2. The optical element according to claim 1, wherein a water contact angle on the surface on which the structures are formed is 30° or less.

3. The optical element according to claim 1, wherein an aspect ratio of the structures is within a range of 0.6 or more and 5 or less.

4. The optical element according to claim 1, wherein the structures are arranged so that a plurality of track rows are formed on the surface of the base material and form a lattice pattern.

5. The optical element according to claim 4, wherein the lattice pattern is at least one of a hexagonal lattice pattern, a quasi-hexagonal lattice pattern, a tetragonal lattice pattern, and a quasi-tetragonal lattice pattern.

6. The optical element according to claim 4, wherein the structures each have an elliptical cone shape or an elliptical frustum shape, which has a long axis direction along a track extending direction.

7. The optical element according to claim 4, wherein the tracks have a linear or arc shape.

8. The optical element according to claim 4, wherein the tracks meander.

9. The optical element according to claim 1, wherein an average molecular weight between crosslinks of the structures is 400 or more and 10000 or less.

10. The optical element according to claim 9, wherein the average molecular weight between crosslinks of the structures is 700 or more and 1500 or less.

11. The optical element according to claim 9, wherein the structures contain, as a main component, at least one of an oligomer having two (meth)acryloyl groups and an oligomer having three (meth)acryloyl groups.

12. The optical element according to claim 11, wherein the structures contain, as a main component, an oligomer having two (meth)acryloyl groups.

13. The optical element according to claim 9, wherein the structures contain, as a main component, a linear macromolecule.

14. A display device comprising the optical element according to claim 1.

15. An input device comprising the optical element according to claim 1.

16. An optical element comprising:
a plurality of structures which are fixed at a pitch of 175 nm or more and 350 nm or less and which each comprise a convex portion, wherein
a water contact angle on the surface on which the structures are formed is 110° or less,
a crosslink density of the structures is 0.8 mol/L or more and 5.1 mol/L or less,
lower portions of adjacent ones of the structures are bonded to each other,
an elastic modulus of a material forming the structures is 1 MPa or more and 1200 MPa or less, and
a surface on which the structures are formed is hydrophilic.

17. An optical element comprising:
a base material having a surface; and
a plurality of structures which are arranged on the surface of the base material at a pitch of 175 nm or more and 350 nm or less and which each comprise a convex or concave portion, wherein
a water contact angle on the surface on which the structures are formed is 110° or less,
a crosslink density of the structures is 0.8 mol/L or more and 5.1 mol/L or less,
an elastic modulus of a material forming the structures is 1 MPa or more and 1200 MPa or less,
the surface on which the structures are formed is hydrophilic, and
the surface of the base material is in an x-y plane, and the convex and concave are in a z direction which is perpendicular to the x-y plane.

18. An optical element comprising:
a base material having a surface; and
a plurality of structures which are fixed on the surface of the base material at a pitch of 175 nm or more and 350 nm or less and which each comprise a convex or concave portion, wherein
a crosslink density of the structures is 0.8 mol/L or more and 5.1 mol/L or less,
an elastic modulus of a material forming the structures is 1 MPa or more and 1200 MPa or less,
the surface on which the structures are formed is hydrophilic, and
an average molecular weight between crosslinks of the structures is 400 or more and 10000 or less.

* * * * *